US012625298B2

(12) United States Patent
Parkin

(10) Patent No.: US 12,625,298 B2
(45) Date of Patent: May 12, 2026

(54) METHOD OF MANUFACTURE OF A METASURFACE

(71) Applicant: MAX PLANCK GESELLSCHAFT ZUR FÖRDERUNG DER WISSENSCHAFTEN EV, Munich (DE)

(72) Inventor: Stuart S.P. Parkin, Halle (DE)

(73) Assignee: MAX PLANCK GESELLSCHAFT ZUR FÖRDERUNG DER WISSENSCHAFTEN EV, Munich (DE)

( * ) Notice: Subject to any disclaimer, the term of this patent is extended or adjusted under 35 U.S.C. 154(b) by 388 days.

(21) Appl. No.: 17/776,376

(22) PCT Filed: Nov. 12, 2020

(86) PCT No.: PCT/EP2020/081852
§ 371 (c)(1),
(2) Date: May 12, 2022

(87) PCT Pub. No.: WO2021/094422
PCT Pub. Date: May 20, 2021

(65) Prior Publication Data
US 2022/0397703 A1 Dec. 15, 2022

(30) Foreign Application Priority Data

Nov. 12, 2019 (EP) ..................................... 19208484

(51) Int. Cl.
*G02B 1/00* (2006.01)
*G02B 5/00* (2006.01)

(52) U.S. Cl.
CPC ............. *G02B 1/002* (2013.01); *G02B 5/008* (2013.01)

(58) Field of Classification Search
CPC ........ G02B 5/008; G02B 1/002; G02B 1/007; G02B 26/06; G02B 1/005; G02B 5/1809; G02F 1/292; G02F 2202/30
See application file for complete search history.

(56) References Cited

U.S. PATENT DOCUMENTS

2016/0112050 A1* 4/2016 Gotsmann ............... F28F 13/00
331/66
2016/0144406 A1* 5/2016 Astier ................... B07B 1/4609
209/675

(Continued)

FOREIGN PATENT DOCUMENTS

EP 3 012 847 A1 4/2016

OTHER PUBLICATIONS

Ju, et al., "Graphene plasmonics for tunable terahertz metamaterials," Nature Nanotechnology, (2011) vol. 6, pp. 630-634.

(Continued)

*Primary Examiner* — Jonathan Y Jung
(74) *Attorney, Agent, or Firm* — ProPat, LLC; Cathy R. Moore

(57) ABSTRACT

The present invention relates to a new method for making metasurfaces comprising liquid gating. VO₂ is an exemplary substrate for use in the present invention. The inventive metasurfaces can be used as a planar lens, vortex generator, beam deflector, and axicon, inter alia. The inventive methods allow metasurfaces to be formed readily on curved or flexible surfaces.

24 Claims, 17 Drawing Sheets

(56)        References Cited

U.S. PATENT DOCUMENTS

| | | | |
|---|---|---|---|
| 2017/0294546 A1* | 10/2017 | Ghidiu | C01B 32/949 |
| 2017/0323945 A1* | 11/2017 | Haque | H01L 29/42316 |
| 2017/0373335 A1* | 12/2017 | Aetukuri | C01B 13/0255 |
| 2018/0059440 A1* | 3/2018 | Yu | G11C 11/56 |
| 2019/0064551 A1* | 2/2019 | Gooth | H10N 70/8833 |
| 2021/0028547 A1* | 1/2021 | Falk | H01Q 3/44 |

OTHER PUBLICATIONS

Miao, et al., "Widely Tunable Terahertz Phase Modulation with Gate-Controlled Graphene Metasurfaces," Physical Review, (2015) vol. 5, 041027 pp. 1-13.

* cited by examiner

Figures 9A, 9B:
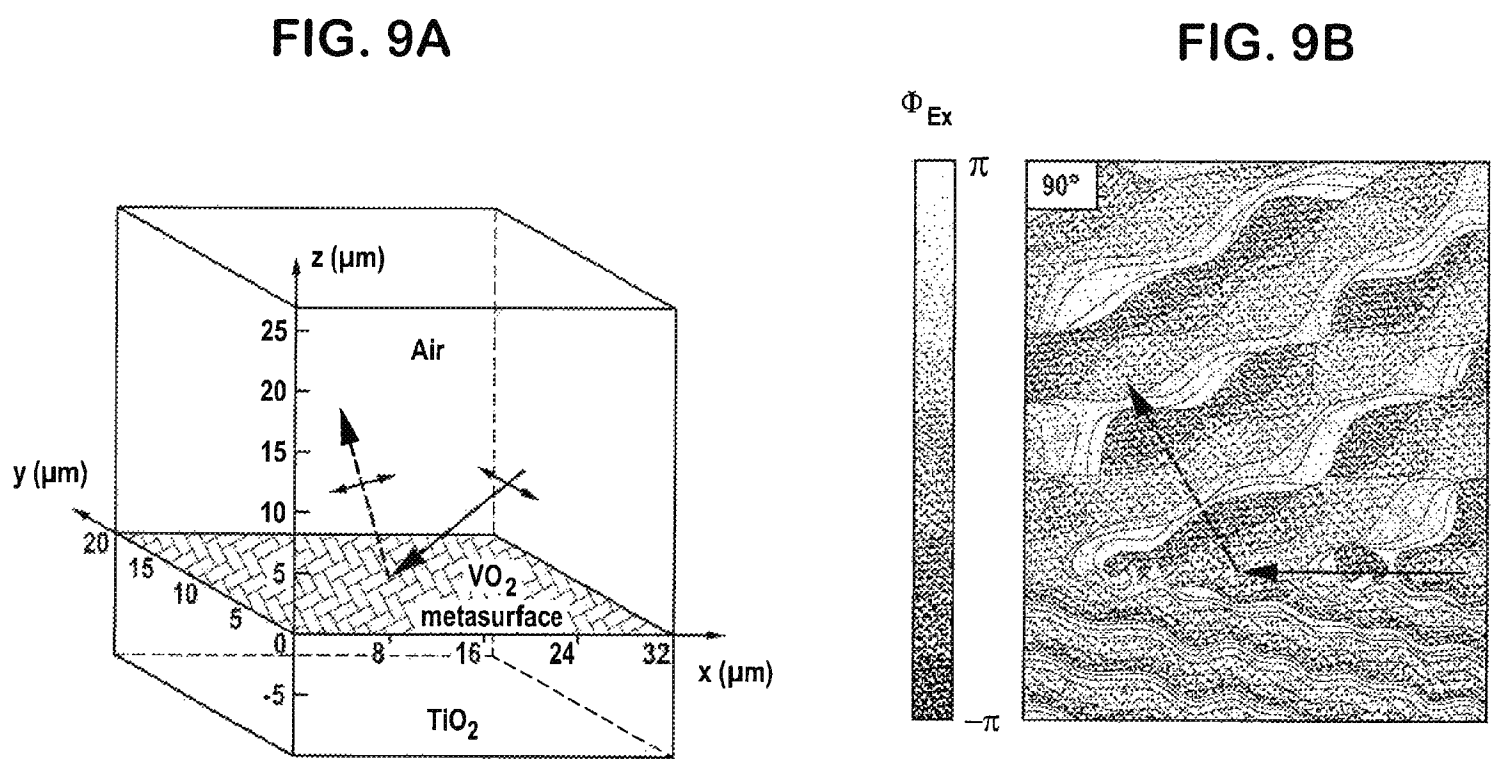

Figures 9C, 9D, 9E:
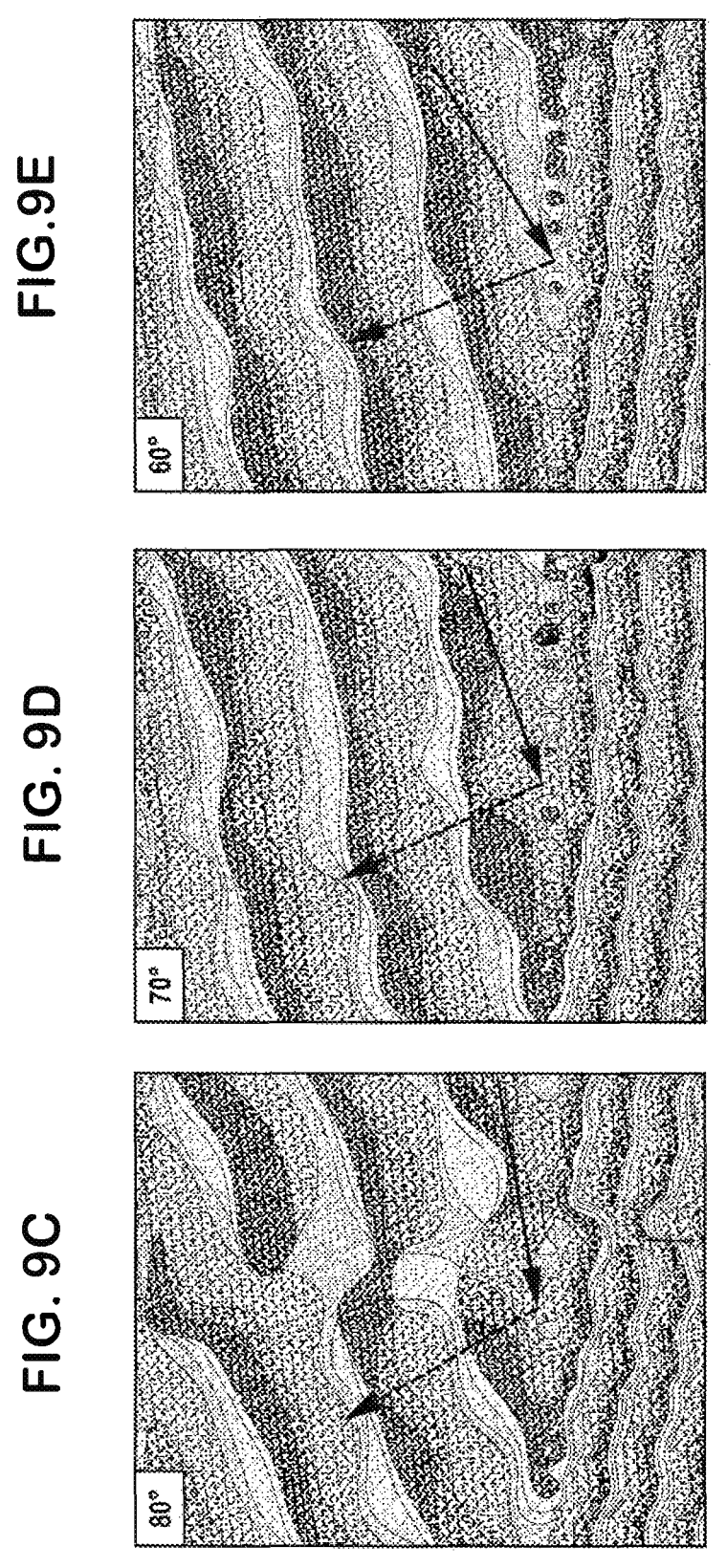

Figures 9I, 9J, 9K:
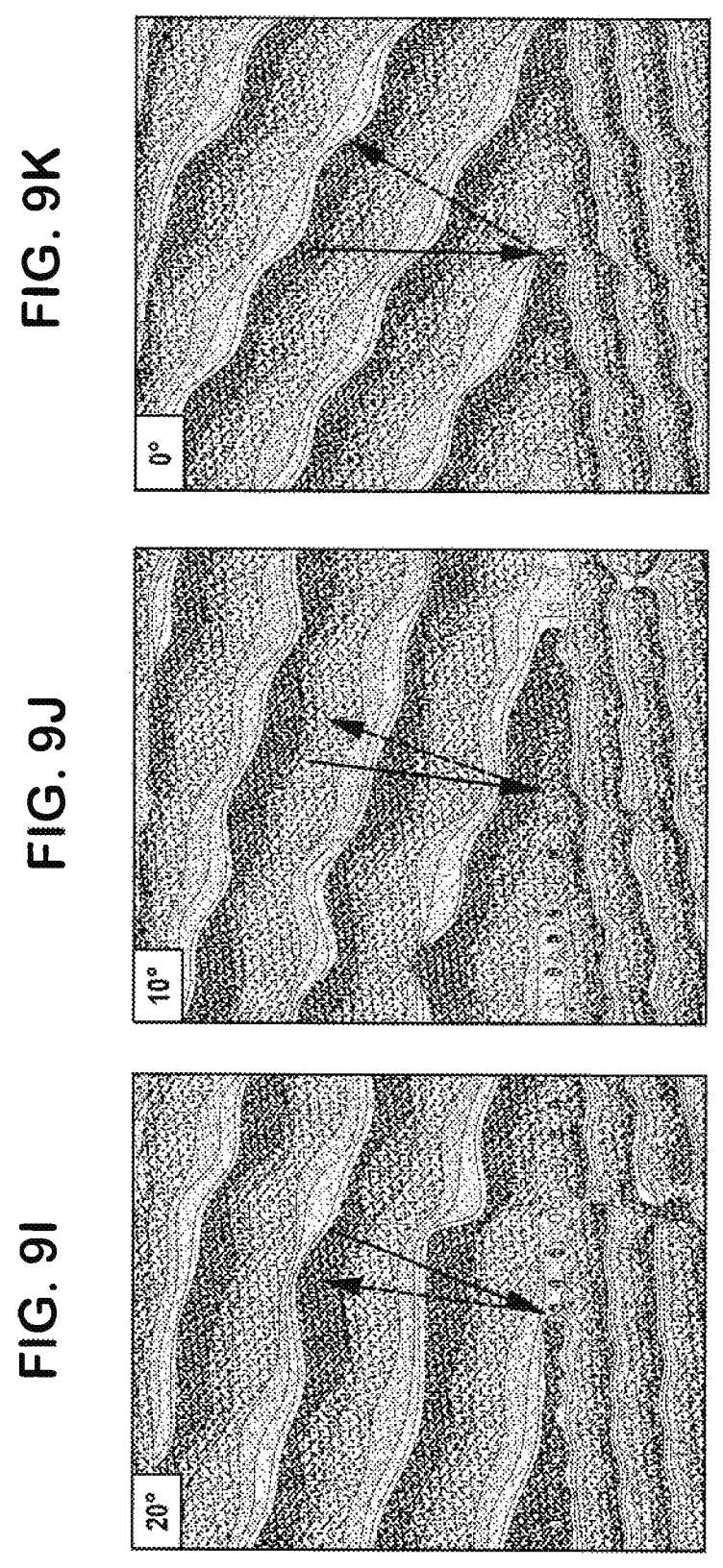

Figures 9L, 9M, 9N:
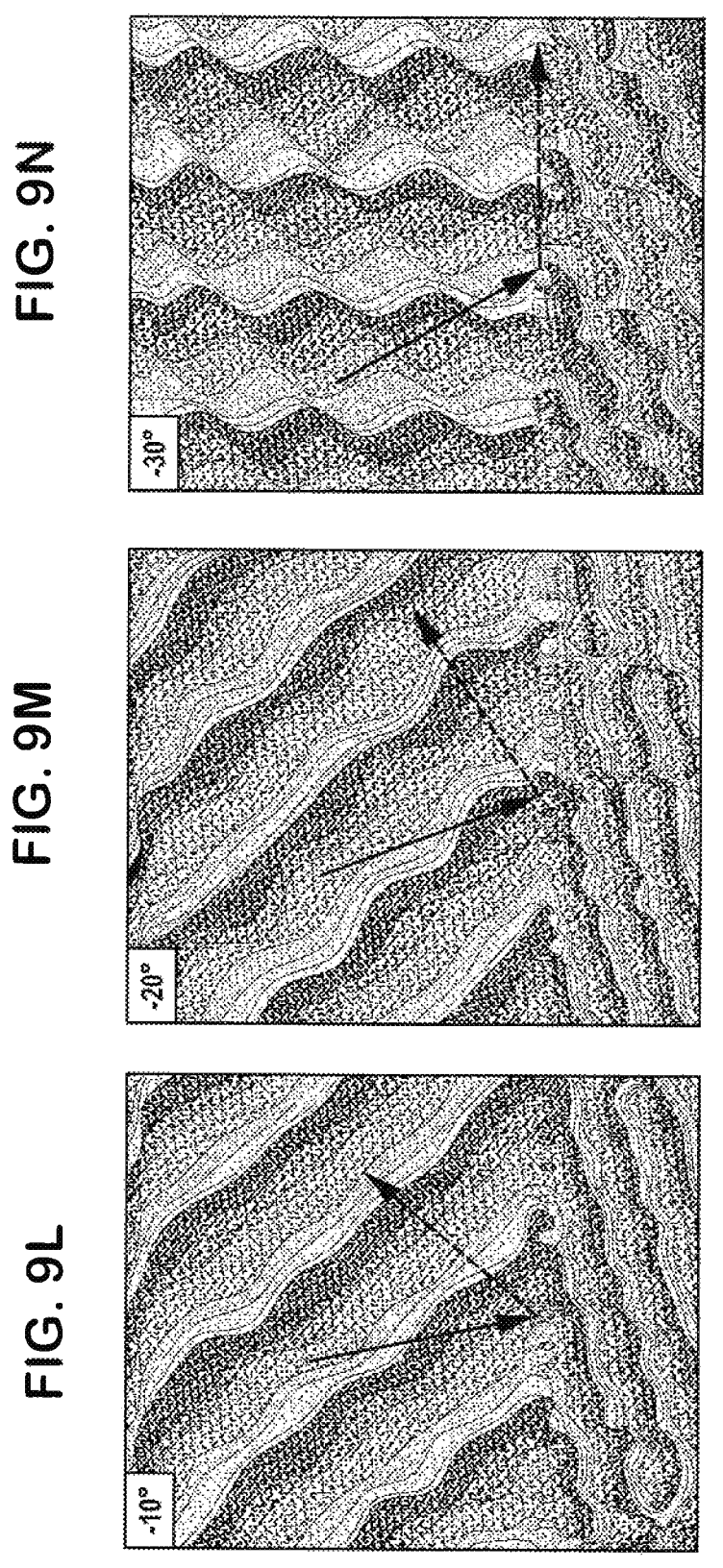

METHOD OF MANUFACTURE OF A METASURFACE

CROSS-REFERENCE TO RELATED APPLICATIONS

This application is being filed under 35 U.S.C. § 371 as a National Stage Application of pending International Application No. PCT/EP2020/081852 filed Nov. 12, 2020, which claims priority to the following parent application: European Patent Application No. 19208484.6, filed Nov. 12, 2019. Both International Application No. PCT/EP2020/081852 and European Patent Application No. 19208484.6 are hereby incorporated by reference herein in their entirety.

FIELD OF THE INVENTION

Metasurfaces can be described as one- and two-dimensional plasmonic arrays (scattering elements) with a periodicity which is small compared to the length of the operating wavelength (subwavelength periodicity). Due to the negligible thickness of these surfaces (ultrathin films) compared to the wavelength of operation, metasurfaces can be considered as an interface of discontinuity enforcing an abrupt change in both the amplitude and phase of the impinging electromagnetic wave.

BACKGROUND OF THE INVENTION

Early examples of metasurface properties are the dark areas in the reflection spectra of subwavelength metallic grating. This unusual phenomenon was named Wood's anomaly and led to the discovery of the surface plasmon polariton (SPP), a particular electromagnetic wave excited at metal surfaces. Subsequently, another important phenomenon, the Levi-Civita relation, was introduced, which states that a subwave-length-thick film can result in a dramatic change in electromagnetic boundary conditions.

Recently, some novel phenomena such as ultra-broadband coherent perfect absorption were demonstrated, where a 0.3 nm thick film could absorb all electromagnetic waves across the RF, microwave, and terahertz frequencies.

In optical applications, an anti-reflective coating can be regarded as a simple metasurface, as it was first observed by Lord Rayleigh. In recent years, several new metasurfaces have been developed, including plasmonic metasurfaces, metasurfaces based on geometric phases, and metasurfaces based on impedance sheets.

One of the most important applications of metasurfaces is to control a wavefront of electromagnetic waves by imparting local, gradient phase shifts to the incoming waves, which leads to a generalization of the well known laws of reflection and refraction. In this way, a metasurface can be used as a planar lens, vortex generator, beam deflector, axicon and so on. In addition, metasurfaces are also applied in electromagnetic absorbers, polarization converters, and spectrum filters, for wireless communications, energy harvesting, imaging, and cloaking.

Besides the gradient metasurface lenses, metasurface-based superlenses offer another degree of control of the wavefront by using evanescent waves. With surface plasmons in the ultrathin metallic layers, perfect imaging and super-resolution lithography could be possible, which breaks the common assumption that all optical lens systems are limited by diffraction, a phenomenon called the diffraction limit.

Classical metasurfaces are artificial sheet materials composed of periodic subwavelength metal/dielectric structures in the horizontal dimensions, which can produce a desired optical wavefront transformation and thereby allows the control of direction, polarization, phase, and amplitude for reflected and transmitted optical fields. Metasurface properties require a strong spatial modulation of the light matter interaction strength. This modulation is either achieved using the plasmonic response in metallic antenna structures or with the aid of Mie resonances in dielectric nanostructures (dielectric metamaterials).

OBJECT OF THE INVENTION

For the fabrication of optical metasurfaces, two main approaches were used so far:
  i) top-down methods which rely on photolithography or electron-beam lithography and following etching, deposition, and lift-off processes,
  ii) bottom-up approaches that include laser/ion-beam printing, or self-assembly methods.

Thus, most reported metasurfaces need an additive or subtractive fabrication process and have static functionalities that depend on their fixed geometrical parameters and cannot be changed after fabrication. As a consequence, these techniques lead to irreversible modifications of the metasurface material thereby excluding dynamic adaptations/modifications of the metasurface. Moreover, most of these methods are limited to be applied to planar surfaces only, thereby excluding its application to 3D objects.

It was, therefore, an object of the present invention to avoid the above-mentioned disadvantages and to provide for an easier (less process steps) and more flexible method of manufacture of metasurfaces, allowing for a dynamic modification of the metasurface, which inter alia means that the surface modifications are reversible.

BRIEF DESCRIPTION OF THE INVENTION

This object is achieved with a method for making metasurfaces comprising the steps of:
  I. Providing a substrate which exhibits at least two distinct measurable states of an optical property and which can stably but reversibly be transitioned from
    a. a first state of the optical property into at least
    b. one second state of the optical property which is measurably distinct from the first state,
  II. Creating on a surface of the substrate at least one area
    a. outside of which the substrate is in the first state of the optical property, and
    b. inside of which the substrate is in one of the at least one second state of the optical property,
       or
    c. wherein the states of the optical property of the inside area and the outside area are inverted, and
  III. Wherein in step II a desired to be inside area is defined and delineated on the surface of the substrate which is in the first state of the optical property and wherein subsequently the surface in the defined and delineated inside area is contacted with a liquid which reacts with the substrate material to yield in or to bring about the transition into the at least one second state of the optical property within the inside area only,
       or
       wherein in step III the states of the optical property of the surface and the inside area are inverted.

The process according to the invention has the advantage that no subtractive or additive steps are needed in making the metasurface i.e. the composition of the metasurface is contained entirely within the layer that is transitioned by the liquid. The process, therefore, is cheaper, and the surfaces are smoother than, for example, those formed with photolithography. Moreover, the metasurface is dynamic, i.e the optical property can be reversed or dynamically tuned by the inventive process. Another unique advantage of the new process is that it allows metasurfaces to be formed readily on curved or flexible surfaces.

Definition of Terms

Within the meaning of the present invention the following terms in parenthesis whether used in singular or plural form shall have the following meaning:

"Metasurfaces" are one- and two-dimensional plasmonic arrays (scattering elements) with a periodicity which is small compared to the length of the operating wavelength (sub-wavelength periodicity). Due to the negligible thickness of these surfaces (ultrathin films) compared to the wavelength of operation, metasurfaces form an interface of discontinuity enforcing an abrupt change in both the amplitude and phase of the impinging electromagnetic wave.

"Substrate" or "phase change material" is a material which undergoes a change in an optical property, such as refraction (refractive index), diffraction, extinction (coefficient), scattering, absorption, reflection, polarization, transmittance, etc. Thus, the substrate exhibits at least two distinct states of an optical property which are all stable at ambient conditions (i.e. between 10 and 30° C.; between 950 and 1100 hPa). The transition from one state of optical property to another is brought about by a change in the chemical composition of the substrate material, e.g. by its stoichiometric oxygen content. This transition may be instigated by applying an electric potential to the liquid.

$VO_2$ is an example of a substrate which can be used in the present invention. $VO_2$ is one of the most interesting and widely studied correlated materials, which exhibits a metal-to-insulator phase transition (MIT) as the temperature is reduced below ~340 K in bulk material. This phase change is accompanied with a dramatic change in the optical properties. In metasurfaces consisting of arrays of metal split-ring resonators (SRRs) on a $VO_2$ layer, the optical performances (e.g. transmissivity and reflectivity) were successfully controlled by temperature variation, THz laser, or voltage induced phase transition. But in all cases the fabrication of the metasurface relied on conventional deposition and lift-off processes. Although a spatial modulation of the metallicity in an otherwise continuous $VO_2$ layer was realized by selective ion bombardment (defect generation) and used to demonstrate a tunable polarizer in the MIR range, the manipulation of direction, polarization, and phase for reflected and transmitted optical fields is still missing.

Recently, a so-called "ionic liquid gating" was shown to suppress the metal-to-insulator transition and stabilize the metallic phase of $VO_2$ thin films by extraction of a minimal atomic amount of oxygen (about 0.3 atom-%; $VO_2 \rightarrow VO_{1.994}$) under the intense electric field created by polarizing an ionic liquid at the surface of the oxide film. In "ionic liquid gating" an ionic liquid is brought into contact with the thin film $VO_2$ surface and an electric potential is applied between the ionic liquid and an electrode which is also in contact with the ionic liquid. The $VO_2$ surface treated in this way is "gated", i.e. in the treated areas the metal-to-insulator transition is suppresses and the metallic phase is stabilized. The gating effect is highly dependent on the $VO_2$ crystal facet, which is related to the ease of electric-field-induced motion of oxygen ions along chains of edge-sharing $VO_6$ octahedra that exist along the rutile c axis. The highly face-dependent gating effect only allows the out-of-plane oxygen extraction without notable in-plane diffusion to create sharp structures in the area of contact between the $VO_2$ substrate surface and ionic liquid. The refractive index of the gated $VO_2$ state is lower than the initial (ungated) one, whereas the extinction coefficient spectrum shifts to longer wavelengths in the gated state. Higher extinction coefficient is observed near the infrared wavelengths for the gated state. All of these changes in optical properties after gating are quite similar to the case when $VO_2$ is switched from insulating to metallic states by temperature change.

Other substrate materials for the present invention which undergo a change in an optical property includes $WO_3$, $MoO_3$, $SrCoO_3$ or $SrTiO_3$.

"Optical property" means an optical property, such as refraction (refractive index), diffraction, extinction (coefficient), scattering, absorption, reflection, polarization, transmittance, etc., all of which can easily be determined and quantified using typical commercial measuring instruments.

"State of optical property" means a quantified state of an optical property. Two otherwise identical substrate materials are in a different state of an optical property when they are measurably distinct from each other in this optical property. Measurably distinct means that the optical property varies by a statistically significant amount or factor which is typical for the state transition in question.

"Transition" means that the material in question can be converted from one first state of optical property into at least one other second state of optical property, which is measurably distinct from the first state. The means for such a transition may be a change in pressure and/or temperature, the application of an electrical field, a chemical reaction etc. Preferably it is a change in the chemical composition of the material, more preferred a change in the oxygen content.

"Stable" means that state of optical property remains unchanged under ambient conditions for a minimum amount of time. Ambient conditions means between 10 and 30° C. and between 950 and 1100 hPa. A minimum amount of time means at least 100 days, preferably at least 1000 days, more preferably at least 10000 days.

"Reversibly" means that the transition from one first state of optical property into another second state of optical property can be reversed from the second state back into the first state.

An "area" created on a surface of the substrate is a part of the surface which is delineated from another part of the surface by a boundary of infinitesimal width. The area may form a closed area having a perimeter of infinitesimal width which delineates the inside of the area from the outside of the area. Infinitesimal width means 1-1000 nm, preferably 5-500 nm, more preferred 5-100 nm.

"Yield in/bring about" the transition means that the applied liquid reacts with the substrate in a way that changes the chemical composition of the substrate material (=chemical reaction) so that the resulting chemical product in the area of contact is transitioned from a first state of optical property into another second state of optical property, which is measurably distinct from the first state. In an alternative embodiment or simultaneous to the chemical reaction the liquid can be used as an electrical conducting fluid allowing and/or aiding in the transport of electrons and/or ions to or from the substrate in the area of contact and/or to apply an electrical potential.

"Liquid" means a fluid medium, e.g. water, an alcohol like ethanol, methanol etc., a hydrocarbon like pentane, hexane etc., a halogen containing hydrocarbon like chloroform etc., which reacts with the substrate material to yield in or to bring about the transition into the at least one second state of optical property within the exposed inside area(s) only. In an alternative embodiment the liquid can be an electrical conducting fluid allowing and/or aiding in the transport of electrons and/or ions to or from the substrate in the exposed area(s) of contact and/or to apply an electrical potential. One preferred liquid is an ionic liquid, which is an organic or inorganic liquid which contains or consists of ions. Examples are aqueous solutions of organic or inorganic water soluble salts, e.g. NaCl, KCl, etc. or organic ionic liquids like 1-Ethyl-3-methylimidazolium bis(trifluoromethylsulfonyl)imide (EMIM-TFSI), 1-Propyl-3-methyl-imidazolium bis(trifluoromethylsulfonyl)imide, 1-Butyl-3-methylimidazolium bis(tri-fluoromethylsulfonyl)imide or 1-Hexyl-3-methylimidazolium bis(trifluoromethyl-sulfonyl)imide. These imidazolinium compounds are room temperature ionic liquids (RTIL). They are non-aqueous solvents, which are advantageous over traditional aprotic polar organic solvents in electrochemical reactions. They have a low vapor pressure, high thermal stability and good electrical conductivity.

DETAILED DESCRIPTION OF THE INVENTION

The process according to the invention transitions a surface of a substrate into a metasurface. The process is able to create plasmonic arrays (scattering elements) on the surface of a phase change material (substrate). Liquid gating, preferably ionic liquid gating (ILG), through a resist mask with holes, is used on a layer of a substrate (a phase change material) in order to locally create regions of an altered state of an optical property. The created regions may have various dimensions within the remaining areas of un-altered state of the optical property. The liquid, preferably the ionic liquid brings about a phase change, i.e. a change in an optical property in the local regions under the holes (see FIG. 1AI-III). This approach is highly flexible, as it does not require physical (subtractive) patterning of the substrate material. This approach opens a way towards electrically reconfigurable metamaterials which can act as for instance phased array reflectors.

The substrate itself is a two dimensional material of negligible thickness (a thin film). The thickness is typically in the range of 1-1000 nm, preferably 5-500 nm, more preferably 5-100 nm. The planar size of the substrate is typically in the range of 1-1000 mm², preferably 10-500 mm², more preferably 50-299 mm². Techniques such as chemical solution deposition (CSD), spin coating, chemical vapor deposition (CVD), plasma enhanced CVD, atomic layer deposition (ALD), molecular layer deposition (MLD), electron beam evaporation, molecular beam epitaxy (MBE), sputtering, pulsed laser deposition, cathodic arc deposition (arc-PVD) or electrohydrodynamic deposition can be used to manufacture the ultrathin films of substrate material. It is surprising that the films can even be up to about 1 μm thick and still the liquid gating, specifically ILG, at the film surface results in a dramatic change of the optical property in the entire thickness of the layer. This is a result of the diffusion of ions from within the interior of the film controlled by ILG. When the ionic diffusion occurs preferentially along certain crystallographic directions the crosssectional area of the modified material is defined by the "hole" in the resist layer (the "mask").

Accordingly, it may be desirable for the transition from one state of optical property into another of the substrate to create the substrate surface in a preferred, predetermined direction of a crystallographic face expressed in terms of h,k,l-indices, e.g. the [100] direction, or the [001] direction, or the [111] direction etc. This may be advantageous if e.g. the mobility of certain atoms in a certain direction of the unit cell ([h,k,l]) of the substrate material is higher/lower than in another direction.

Such a growth of the thin film in a predetermined direction can be facilitated by epitaxy, where the substrate of interest is grown on an "inducing" surface of a second material which exhibits a physical surface which matches the desired direction [h,k,l] of the to be grown substrate and which exhibits a crystallographic structure and unit cell dimensions which are at least similar, if not close to identical (so called "lattice matching"; i.e. unit cell axis and/or angle deviation of max. 10%, preferably max. 5%, more preferred max. 3%) to the one of the to be grown substrate material. Such epitaxy methods are known to the skilled person. It is also possible to form films that are predominantly of one crystal texture but which are not crystallographically oriented with respect to the substrate. This is often referred to as polycrystalline epitaxy. Polycrystalline films with one preferred crystal orientation perpendicular to the plane of the film can be formed by use of underlayers that themselves grow with a preferred crystalline orientation and that thereby induce the epitaxial growth of the thin film of interest.

In the next step the defined and delineated inside areas are formed on the substrate surface. The shapes of the delineated areas can take any desired form which is suitable for the kind of metasurface to be manufactured. E.g. they can be arranged as plasmonic arrays in a series of classic plasmonic V-antennas pattern. The shapes are designed and arranged on the surface of the substrate material. The predesigned delineated area shapes on the surface in which the state of optical property shall be transitioned from its initial state to a measurably distinct at least second state can be created e.g. by applying lithographic techniques, i.e. by creating a structured mask which covers the to be modified surface of the substrate. Typical lithographic resists, suitable for exposure using light, electron beams or heat, can be used to cover the surface of the substrate in a thin layer (thickness: 100-1000 nm, preferably 150-750 nm, more preferred 200-400 nm). Subsequently the desired forms of the to be transitioned areas are cut out of the resist cover layer, thereby exposing the substrate surface in the cut out areas only. Cutting can be performed e.g. with precision electron beam lithography methods by use of modification of the chemical properties of the resist layer and their subsequent removal by dissolution by use of suitable chemical solvents. The resulting structures can have widths or radii which depend on the wavelength of light the desired metasurface is designed to be operated at of ≤50 nm, preferably ≤25 nm, more preferred ≤10 nm.

In the next step the state of optical property of the exposed area(s) of the substrate surface is (are) transitioned from its initial state of optical property to a measurably distinct at least second state of optical property. During this step the surface in the defined and delineated exposed inside area(s) is (are) contacted with a liquid which reacts with the substrate material to yield in or to bring about the transition into the at least one second state within the exposed inside area(s) only. This process is called "liquid gating" since the liquid forms ion "gates" in the exposed surface area(s). The applied liquid reacts with the substrate in a way that changes the chemical composition of the substrate material—preferably the oxygen content—(=chemical reaction) so that the resulting chemical product in the area(s) of contact (the exposed area(s)) is (are) transitioned from a first state of optical property into another second state of optical property. In an alternative embodiment or simultaneous to the chemical reaction the liquid can be used as an electrical conducting fluid allowing and/or aiding in the transport of electrons and/or ions to or from the substrate in the exposed area(s) of contact and/or to apply an electrical potential. One preferred liquid is an ionic liquid, which is an organic or inorganic liquid which contains or consists of ions. Examples are aqueous solutions of organic or inorganic water soluble salts, e.g. NaCl, KCl, etc. or organic ionic liquids like 1-Ethyl-3-methylimidazolium bis(trifluoromethylsulfonyl) imide (EMIM-TFSI), 1-Propyl-3-methyl-imidazolium bis (trifluoromethylsulfonyl)imide, 1-Butyl-3-methylimidazo-lium bis(tri-fluoromethylsul-fonyl)imide or 1-Hexyl-3-methylimidazolium bis(trifluoromethyl-sulfonyl)imide. These imidazolinium compounds are room temperature ionic liquids (RTIL). They are non-aqueous solvents, which are advantageous over traditional aprotic polar organic solvents in electrochemical reactions. They have a low vapor pressure, high thermal stability and good electrical conductivity.

In the embodiment, where the exposed area(s) is(are) contacted with an ionic liquid the transition of state of optical properties is preferably performed by simultaneously applying an electric voltage of 0.1-10 Volts, preferably 1-5 Volts, more preferred 2-4 Volts. In the case of applying an electric voltage the voltage is applied against a counter electrode which is also in contact with the ionic liquid. A preferred material for the counter electrode is a metal, more preferred a metal like Fe, Co, Ni, Pd, Pt, Cu, Ag, Au or Zn, and most preferred Cu, Ag or Au.

The reaction time of the liquid with the exposed area(s) is preferably from 1 second to 10 hours, preferably from 1 minute to 1 hour, more preferred from 10 minutes to 40 minutes.

After completion of the transition the structured resist cover layer may be, and preferably is, removed by known techniques, e.g. washing with a solvent and the obtained metasurface can be dried.

Figure 1A:
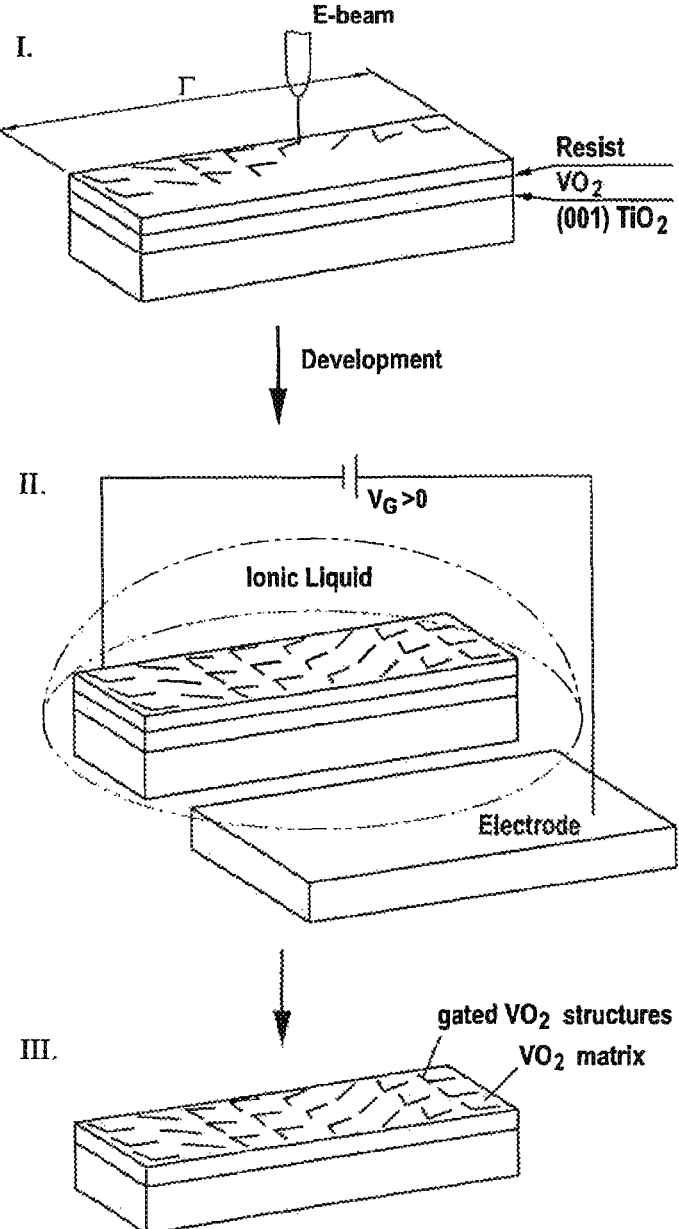
FIG. 1

AI. Electron beam lithography patterning of boomerang-shaped antennas array on $VO_2/TiO_2$.

AII. Ionic liquid gating on $VO_2/TiO_2$ with resist mask on the top.

AIII. Metasurface of boomerang-shaped gated $VO_2$ array in initial $VO_2$ matrix after removal of ionic liquid and resist.

B Resistivity-temperature curves for $VO_2$ films of initial and gated states.

C Refractive index and

D extinction coefficient of initial (300 and 330 K), and gated 20 nm $VO_2$ thin film (+3V 0.5 hour, 300K).

FIG. 2

A Representative conductive atomic force microscope image,

B Amplitude and

C phase of near-field optical microscopy images,

D Amplitude and

E phase of simulated near-field maps for one period of the gated $VO_2$ boomerang-shaped antennas. The periodic length of the array is 16 μm.

F The extracted near-field phase at the right-most tip of the boomerang-shaped antennas (blue circles from experimental results c while black square from simulations results e) across one period. The black dashed line is the theoretical phase change at different positions.

FIG. 3

A Schematic experimental setup for reflection measurements. The incidence angle $(\theta_i)$ and reflection angle $(\theta_r)$ are marked by black and red arrows. The intensity mapping $(\theta_r$ versus $\theta_i)$ of far-field reflection for $VO_2$ thin films B without and C with ionic liquid gating through resist mask at a $\lambda_0=8.05$ μm. The dot lines indicate the theoretical prediction of the peak position using the generalized Snell's law of different orders (N=0, ±1, ±2, and ±3).

D Typical simulated phase distribution of x-polarized electric field $(\phi_{Ex})$ under the illumination of a normally incident y-polarized EM wave. The corresponding positions of simulated results are marked by red circles in c.

FIG. 4

Conductive atomic force microscope images of $VO_2$ after ionic liquid gating through boomerang-shaped antennas array resist mask with different periodic lengths:

A 40 μm and

B 8 μm.

The intensity mapping $(\theta_r$ versus $\theta_i)$ of far-field reflection for $VO_2$ after ionic liquid gating through boomerang-shaped antennas array resist mask with different periodic lengths:

C 40 μm and

D 8 μm.

The dot lines indicate the theoretical prediction of the peak position using the generalized Snell's law of different orders.

E The anomalous reflections (N=−1) for $VO_2$ metasurface with different periodic lengths. The incidence angle is fixed at 45°. The dashed lines indicate the position of theoretical anomalous reflection positions.

FIG. 5

Sketch for the resist mask

FIG. 6

CAFM images of $VO_2$ after patterned ionic liquid gating at varied temperatures

FIG. 7

Sketch for the near-field simulation. The $TiO_2$ substrate is only partly shown.

FIG. 8

A Amplitude and

B phase of near-field optical microscopy images,

C Amplitude and

D phase of simulated near-field maps for one period of the gated $VO_2$ boomerang-shaped antennas. The periodic length of the array is 16 μm. The angle between the polarization of incident light and x (or y) axis is 45°.

FIG. 9

A Sketch for the far-field simulation.

B-N Simulated Ex field patterns on the x-z plane for a model consisting of metallic V-shape $VO_2$ array in insulating $VO_2$ matrix under the illumination of a y-polarized EM wave at different incidence angles from 90° to −30°. The scale bar is 8 μm.

The invention will now be described by way of an example.

EXAMPLE

Based on ILC technology according to the present invention, electron beam lithography was used to fabricate an array of boomerang-shaped holes on the resist coated on the surface of 20 nm $VO_2$ thin films grown on pure as well as a Nb-doped $TiO_2$ (001) substrate (see FIG. 1AI). $VO_2$ films on Nb-doped $TiO_2$ are used for the conductive atomic force microscopy (CAFM) measurements, while $VO_2$ films on pure $TiO_2$ are used in all the other measurements. On different samples, the feature sizes and periodic lengths of these boomerang-shaped holes change from 100 to 500 nm and 8 to 40 μm, respectively. Such a boomerang-shaped antenna array is chosen to achieve the phase coverage of $2\pi$ while maintaining large scattering amplitudes. Secondly, a drop of ionic liquid [EMIM-TFSI, (1-Ethyl-3-methylimidazolium bis(trifluoromethylsulfonyl)imide] is applied to the surface of the sample with a resist mask and an isolated gold electrode. Then a gate voltage of +3 V is applied for 0.5 hour between the gold electrode and the $VO_2$ layer under vacuum conditions (pressure better than 6×10−5 mbar) (see FIG. 1AII). Finally, the ionic liquid gated boomerang-shaped array is achieved by removing the ionic liquid and resist (see FIG. 1AIII).

Figure 1B:
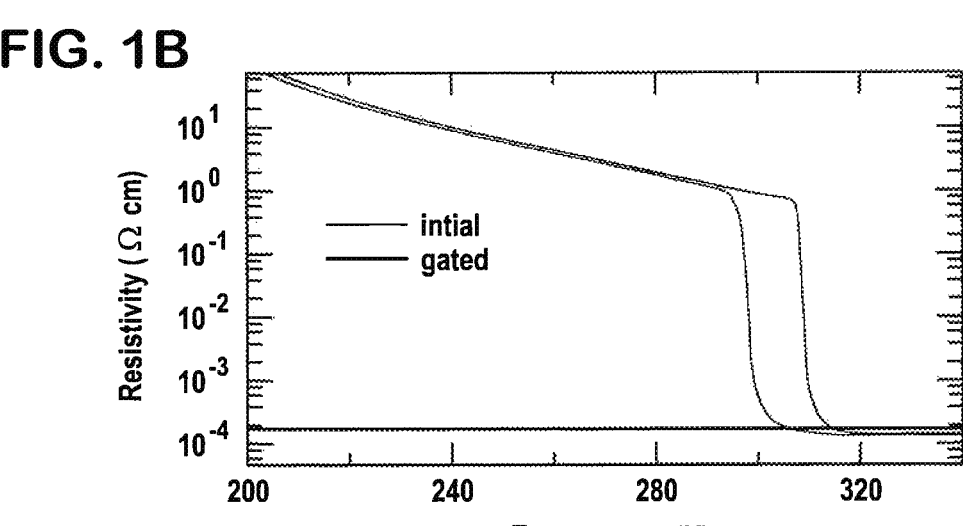

The change of transport properties caused by ILG is measured in a Hall bar device with a lateral gate electrode and shown in FIG. 1B. The initial (as grown) $VO_2$ thin film of 20 nm grown on $TiO_2$ (001) substrate shows the MIT transition (metal-insulator transition) with a resistance change of around four orders of magnitude at ~310 K, which is lower than that of the bulk state (~340 K) because of the tensile strain ("a" lattice parameter TiO2=4.59 Å, "a" lattice parameter VO2=4.55 Å). Differently, a progressive suppression of the MIT in gated $VO_2$ is observed and the metallic state is kept in the temperature range of 200-340 K. The conductivities of the initial (warming branch) and gated $VO_2$ are $1.83\times10^{-4}$ Ωcm and $9.92\times10^{-1}$ Ωcm at 300 K, respectively. The metallization is a consequence of the electric-field-induced extraction of oxygen ions during the gating.

Figure 1C:
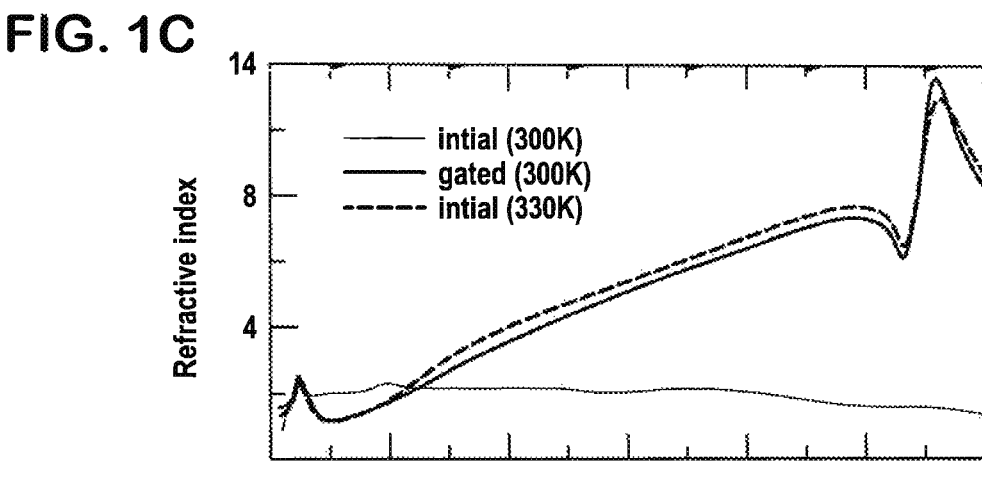
Figure 1D:
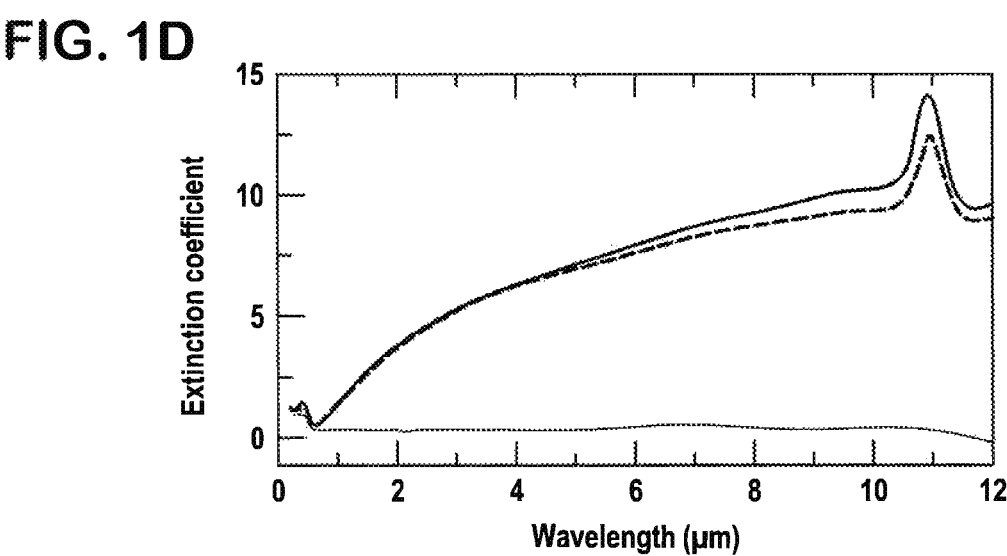

The optical constants of the $VO_2$ layer were determined before and after the gating process using an ellipsometer. For this measurement, a 10×10 $mm^2$ thin film sample was used and after the measurement of the initial state, the sample was gated without any resist mask. FIGS. 1C and D show refractive indices and extinction coefficients of $VO_2$ thin films as a function of wavelength in the initial and gated (gating voltage ($V_G$)=+3 V) states, respectively. The refractive indices of initial and gated $VO_2$ are very close to each other between 200 and 450 nm. For larger wavelengths, the refractive index of gated $VO_2$ first decreases from 2.92 to 1.51 and then dramatically increases to 7.53 at 10 μm. Whilst the refractive index of initial (ungated) $VO_2$ only shows a gradual decline from 2.64 to 1.98 as the wavelength is changed from 2 to 10 μm. The extinction coefficient of gated $VO_2$ monotonously rises between 600 nm and 10 μm to a value of 10.22, while the ungated $VO_2$ shows an extinction coefficient close to zero for the whole spectral range. For $VO_2$ thin film of initial state at 330 K, which is higher than the MIT transition temperature, a very similar refractive index and extinction coefficient spectra was found compared with those of the gated one, confirming the changes of optical constants in the gated sample are related to ILG induced insulator-to-metal transition.

Subsequently, the ILG was done on the sample through the resist mask to make an array of boomerang-shaped antennas inside the $VO_2$ layer.

CAFM Measurement on a Sample Grown on Nb-Doped $TiO_2$ (001) Substrate

Figure 6:
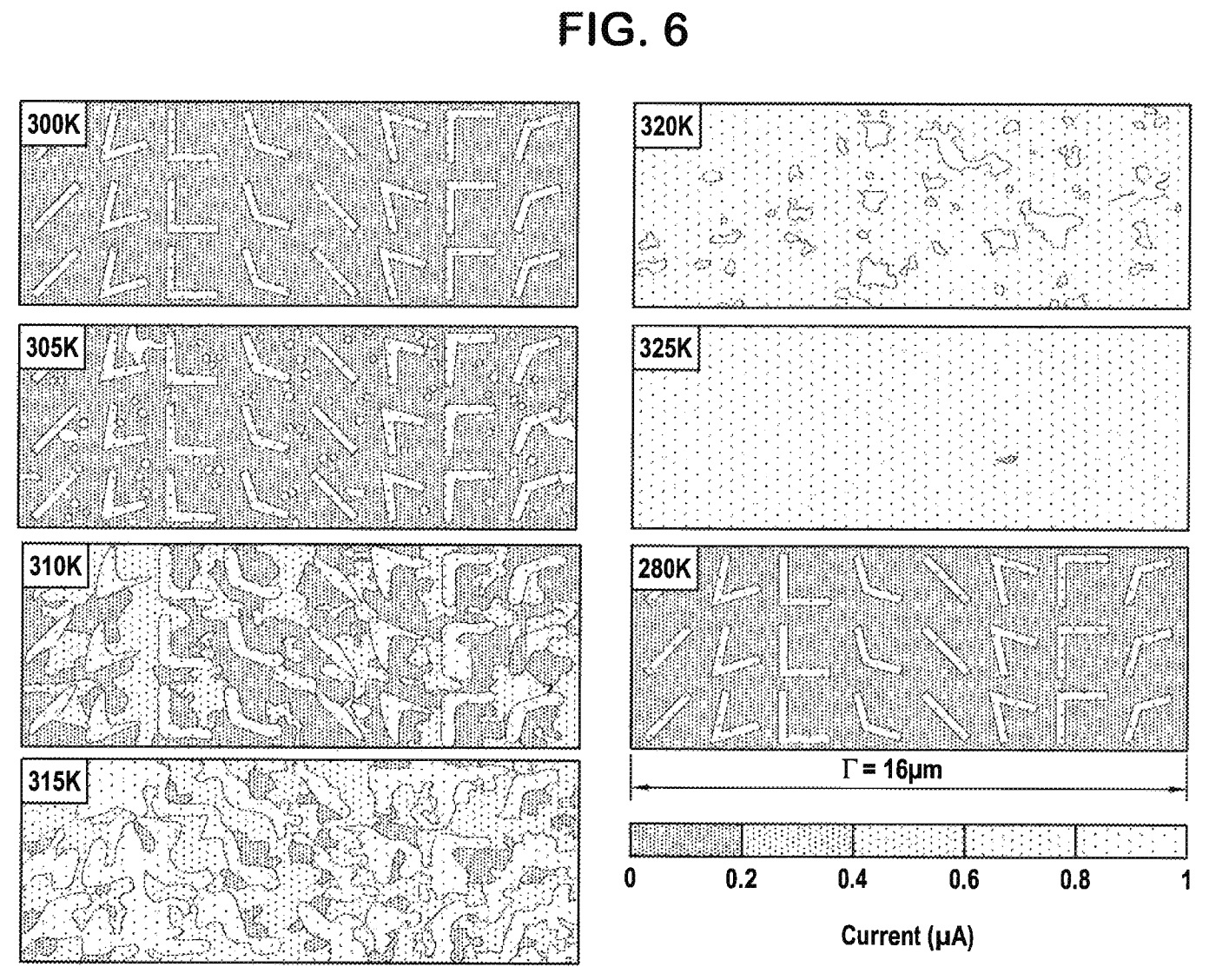

After the gating and cleaning process, the sample was affixed to a metal holder by conductive silver paint on the bottom. In this measurement, a 1 MΩ resistor was connected in series with the $VO_2$/Nb-doped $TiO_2$ heterostructure and the CAFM was used to measure the current flowing across the sample (perpendicular to the surface) at a constant voltage of 1 V. The leakage current mapping shows one period of boomerang-shaped metallic $VO_2$ regions in the insulating $VO_2$ matrix with a periodic length of 16 μm. There is clear evidence that only within the boomerang-shaped holes there are changes in the film conductivity, with a substantial increase in leakage current while the regions covered by resist are still insulating after ILG (see FIG. 2A). The highly face-dependent gating effect only allows the out-of-plane oxygen extraction without notable in-plane diffusion to create sharp metallic $VO_2$ regions in the boomerang-shape. These boomerang-shaped conductive regions act as antennas just like those in conventional metasurfaces that are formed from, for example, Au regions on or within a Si host. What is necessary is that the antennas are formed from materials with distinct dielectric coefficients for the relevant wavelength. The temperature dependent CAFM results show that the conductive antennas become inactive at 330 K but recovered by cooling the sample down (see FIG. 6). The corresponding topography images (not shown) indicate that the conductive regions after gating are slightly higher than the matrix due to the lattice expansion after introducing oxygen vacancies via ILG. For clarity, the metasurface in x-y plane is defined and the unit cell of boomerang-shaped antennas repeat with the periodicity of $\Gamma$ in the x direction, while the direction vertical to the metasurface is set to be z. These definitions are applicable to the following geometries of all the measurements.

s-SNOM Measurement on a Sample Grown on Pure $TiO_2$ (001) Substrate

Figure 7:
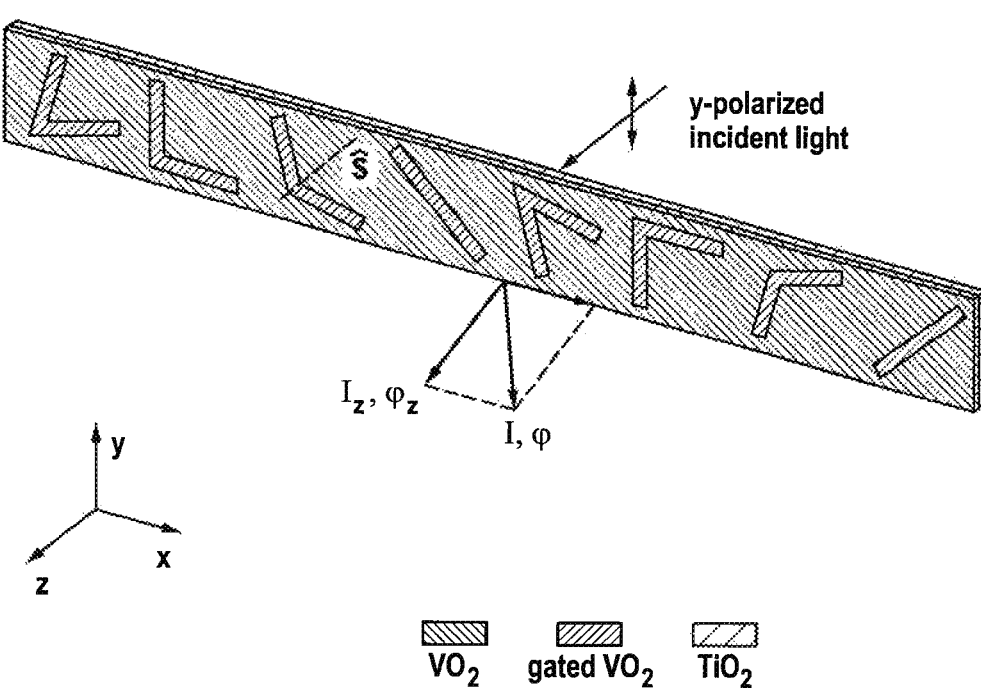

To investigate the phase change in the boomerang-shaped antennas, phase-resolved scattering-type scanning near-field optical microscopy (s-SNOM) is used. The experimental results are compared with simulations. A period of boomerang-shaped metallic $VO_2$ regions in the insulating $VO_2$ matrix with the same shape and size as those in CAFM measurement but grown on pure $TiO_2$ substrate is used for the s-SNOM measurements. A y-polarized incident light beam [wavelength ($\lambda_0$) of 6.2 μm] vertically illuminates the sample from the back side of a double side polished substrate (transmission mode) to get a fully in-plane polarization and resultant lossless phase gradient. Meanwhile, the near-field behavior of the structures is simulated using the completely same condition as that in the experiment (see FIG. 7). In this way, the amplitude and phase maps of near-field intensity ($I_{z\text{-}exp.}$) and phase (($\varphi_{z\text{-}exp.}$) of the optical electric-field component along z direction for $VO_2$ metallic structures are recorded for one period and shown in FIGS. 2B and C, respectively, along with corresponding simulations ($I_{z\text{-}sim.}$ and $\varphi_{z\text{-}sim.}$) in FIGS. 2D and E. Both the experimental and simulated $I_z$ maps (FIGS. 2B and D) indicate that the metallic boomerang-shaped $VO_2$ successfully support both symmetric and antisymmetric charge-oscillation eigenmodes under the y-polarized incident light ($\lambda_0$=6.2 μm), which is similar to the previous works where gold boomerang-shaped antennas were employed. The results for the structures under purely symmetric and anti-symmetric excitation modes are shown in FIG. 8.

Figures 2A, 2B, 2C, 2D:
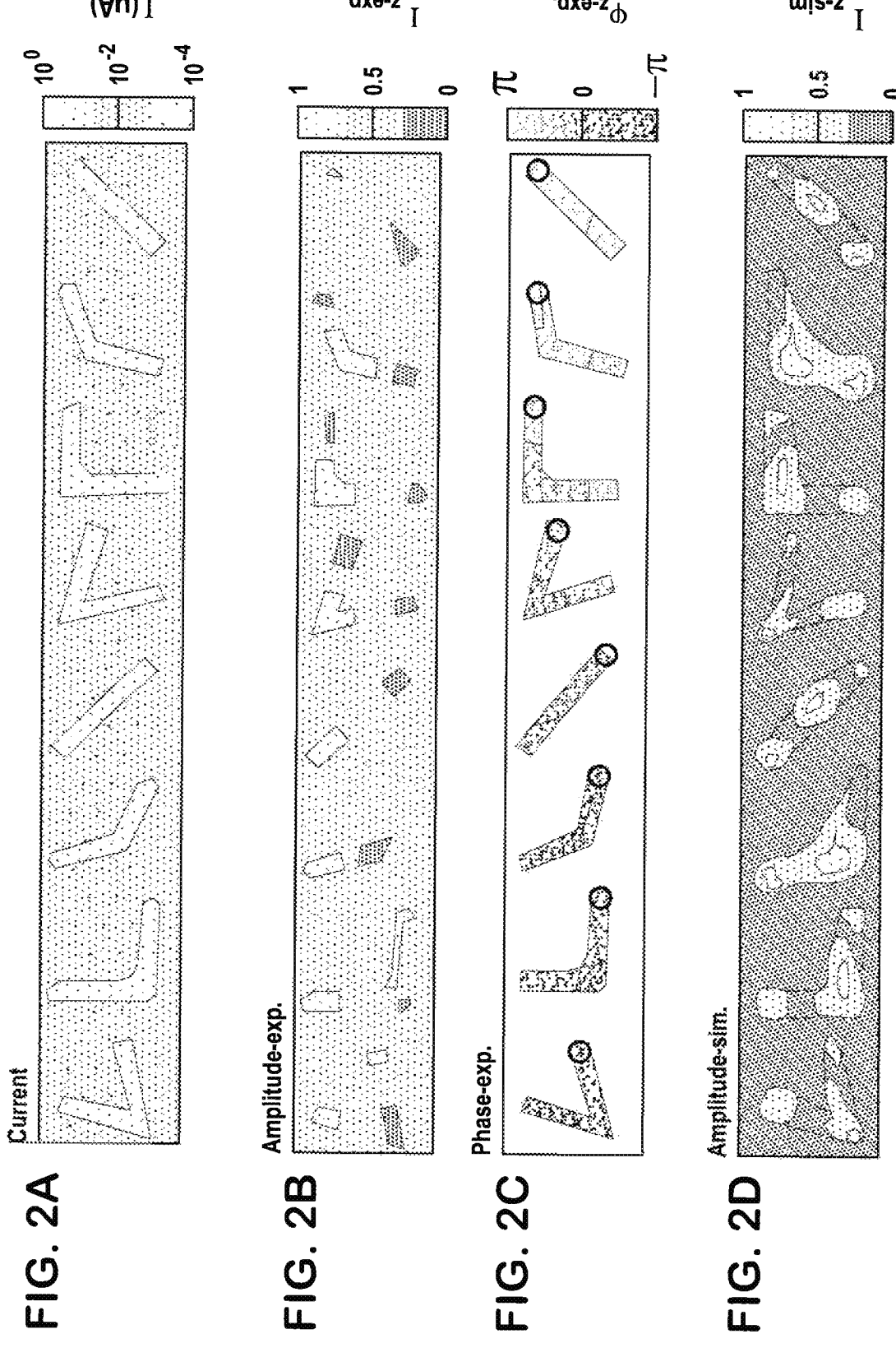
Figure 2E:
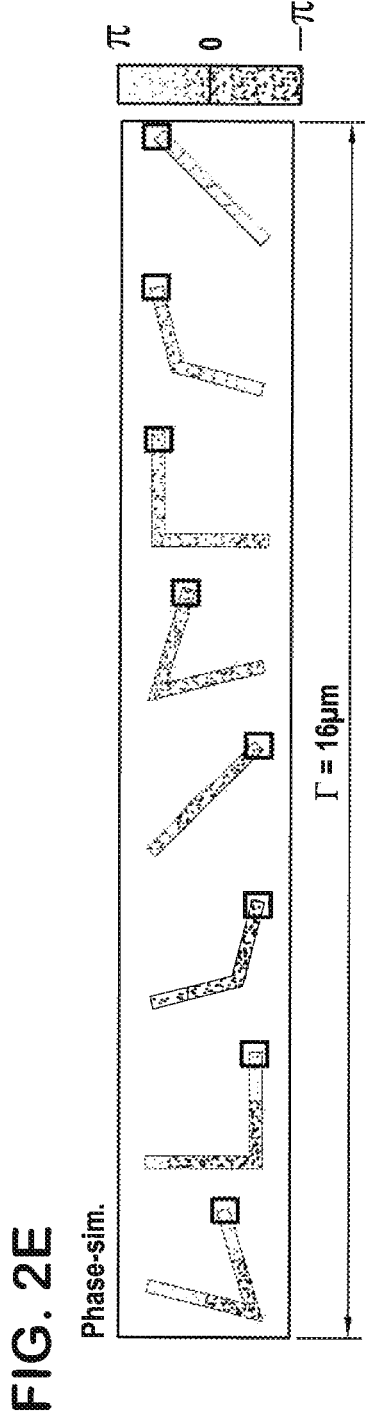
Figure 2F:
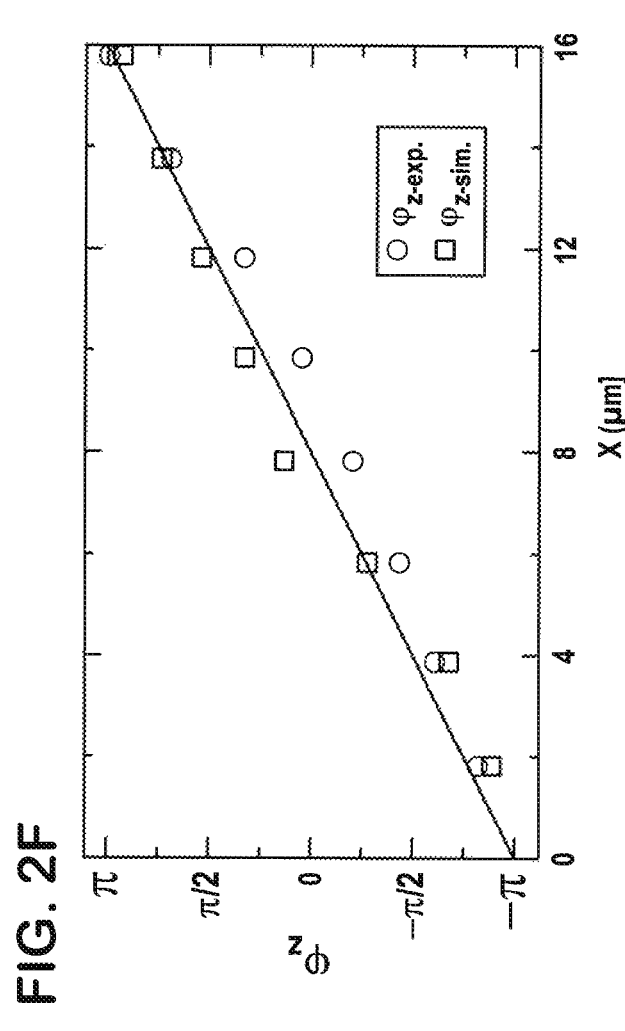

The individual near-field phase ($\varphi_{z\text{-}exp.}$ and $\varphi_{z\text{-}sim.}$) images in FIGS. 2C and E show gradients along the antenna arms, which are the characteristics of simultaneous excitation of both symmetric and antisymmetric antenna modes. The extracted near-field phases at the right-most tip of the boomerang-antennas from both experimental and simulated results (respectively marked by blue hole circles and black hole squares) exhibit a phase change from about $-\pi$ to about $\pi$ across the unit cell where the eight antenna data points are summarized in FIG. 2F. Such a realization of the phase shifts covering $2\pi$ range in one unit cell length provides a full control of the wavefront. Similar intensity and phase change can be also observed in the samples with a periodic length of 8 μm (not shown but similar to FIG. 2).

A $-\pi$ to $\pi$ phase change in one period of boomerang-shaped metallic VO$_2$ antennas is expected to achieve anomalous reflections at far-field based on the generalized Snell's law:

$$\sin\theta_r - \sin\theta_i = N\frac{\lambda_0}{2\pi n_i}\frac{d\varphi}{dx} \tag{1}$$

Figure 3A:
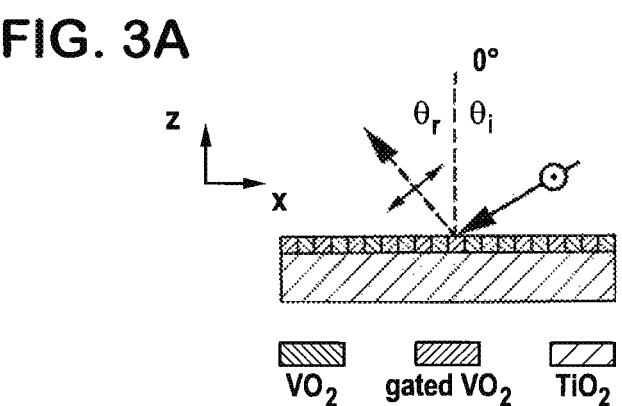

Where, the $\theta_r$ is the reflection angle, $\theta_i$ is the incident angle, $\lambda_0$ is the vacuum wavelength, n$_i$ is the refractive index, and $$\frac{d\varphi}{dx}$$

is the phase gradient. Here, N is an integer (0, $\pm1$, $\pm2$, $\pm3$ . . . ) and stands for the order of reflection, in which N=0 stands for the ordinary reflection, while others for anomalous reflections. To firmly demonstrate the manipulated light propagation by a metasurface created through the patterned ILG according to the present invention, a far-field reflection measurement was carried out using a quantum cascade laser with $\lambda_0$=8.05 μm. The geometry of the far-field measurement setup is schematically illustrated in FIG. 3A . The incident light is y-polarized while a polarizer is used to select the anomalous reflection beam that is supposed to be cross-polarized with respect to the excitation. The y-polarized incident light is chosen to get a 45° angle with respect to the symmetric axis of each antenna so that both symmetric and antisymmetric modes can be excited and the scattered light has a substantial component polarized orthogonal to that of the incident light with a large range of phases and amplitudes for a given wavelength. The $$\frac{d\varphi}{dx}$$

is $2\pi/16$ μm$^{-1}$ and n$_i$ is set to be 1 for air.

Figure 3B:
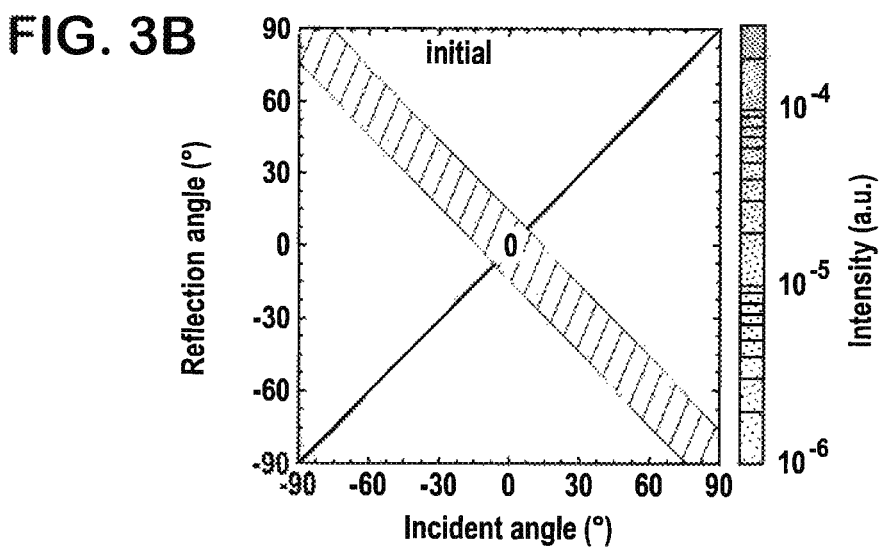
Figure 3C:
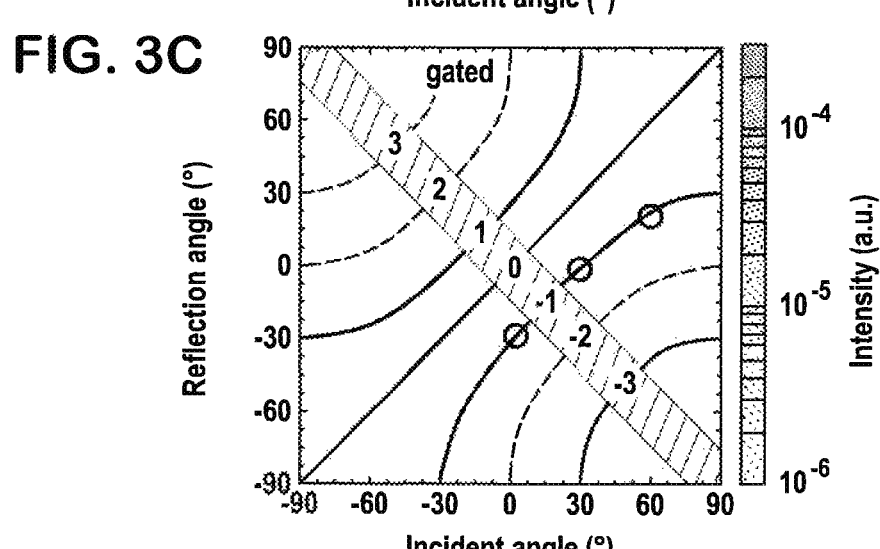

In the $\theta_r$ versus $\theta_i$ for the reflection of initial VO$_2$/TiO$_2$ sample, only weak ordinary (specular) reflection is observed [suppressed by the orthogonal polarizer (relative to the incident light polarization) in front of the detector], suggesting the absence of metasurface before ILG (see FIG. 3B). However, the situation changes dramatically once the sample is gated through a resist mask as shown in FIG. 3C. Despite the weak, two strong anomalous reflection curves are observed, which agree well with the theoretical prediction of generalized Snell's law (Eq. 1) using different orders of $-1$ and 1 (black dotted lines). In addition, very weak reflection curves, which originate from higher order diffraction of the periodic antenna array, are also observed (indicated by $\pm2$ and $\pm3$ in FIG. 3C). Due to restrictions of the measurement setup, the angles marked with the gray area cannot be measured, because at these angles the incident light path is blocked by the detector. Note that the anomalous reflections observed here are caused by the formation of a VO$_2$ metasurface rather than the diffraction effect as the latter one is suppressed in the cross-polarizer measurement.

Figure 3D:
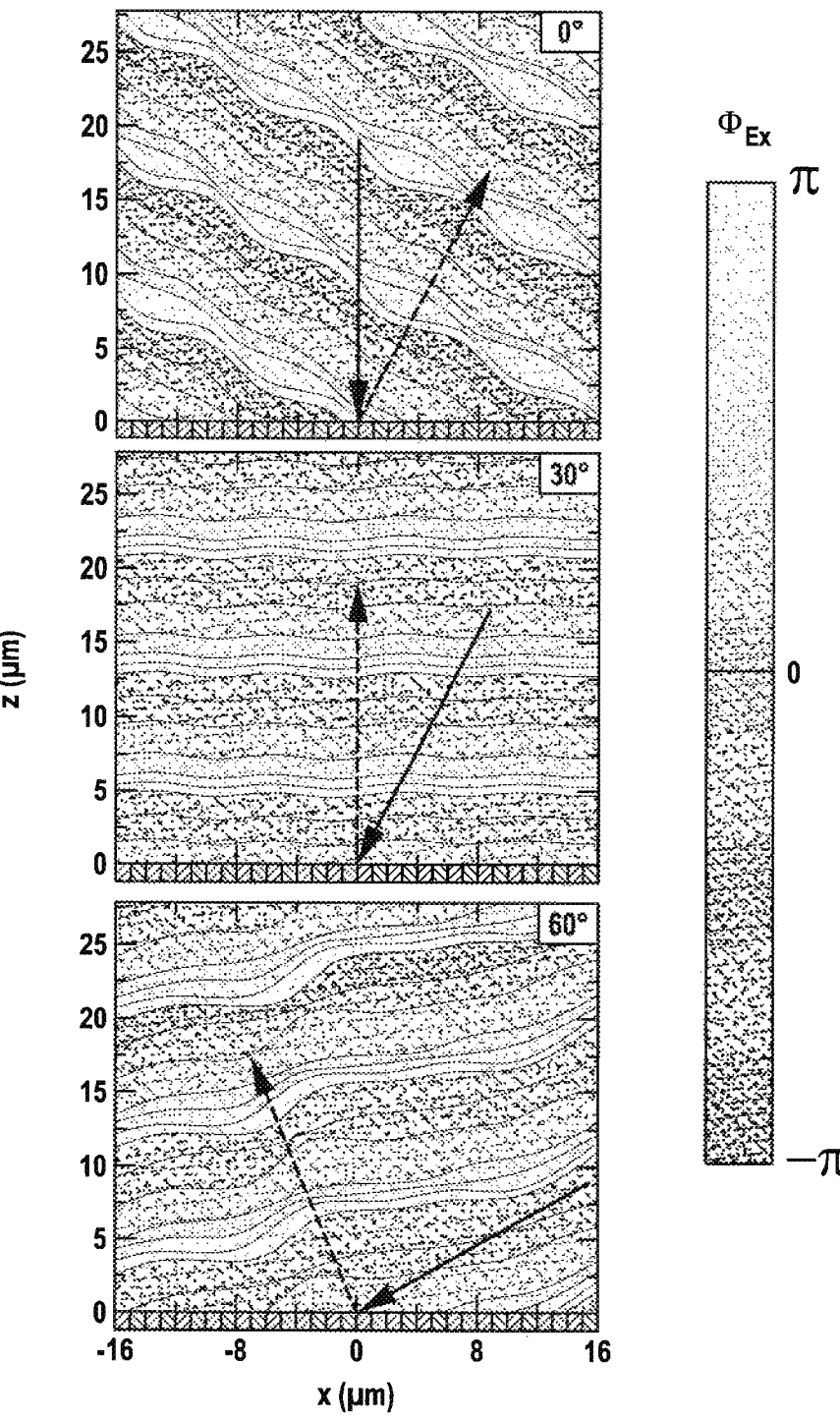

To further confirm the origin of the anormalous reflection behavior from the metasurface, the first-order phase patterns ($\phi_{Ex}$) of x-polarized scattered field ($E_x$) are simulated with representative incident angles from 90° to −30° scattered by the metasurface under the illumination of a y-polarized incident light ($\lambda_0$=8 μm). The patterns in FIG. 3D clearly show that the incident light is anomalously reflected by the metasurface in three typical cases of $\theta_i$=0°, 30° and 60° (marked by the red circles in FIG. 3C). Here the simulated reflection light is filtered by a polarizer orthogonal to the polarization of incident light to remove the ordinary reflection. Apparently, the incident lights with $\theta_i$=0°, 30° and 60° are all reflected nonspecularly ($\theta_r\neq\theta_i$) with $\theta_r$=30.0°, 0° and 21.2°, respectively, which are in agreement with the experimental measurements as shown in FIG. 3C.

Leakage Current Mappings of VO$_2$/Nb-Doped TiO$_2$

Figure 4A:
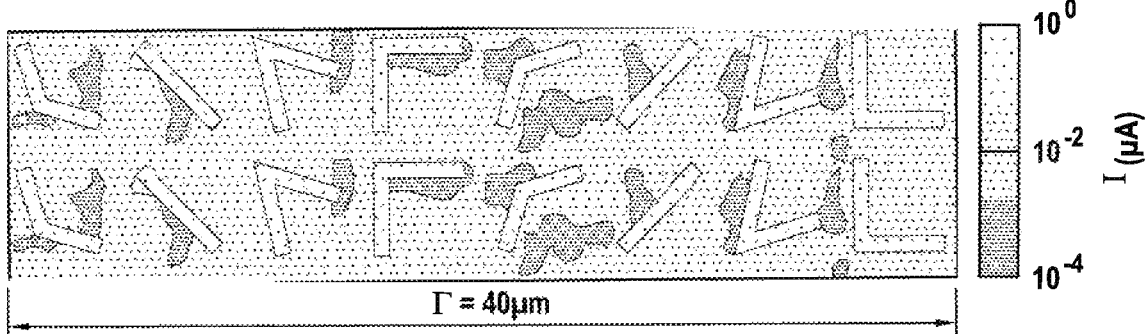
Figure 4B:
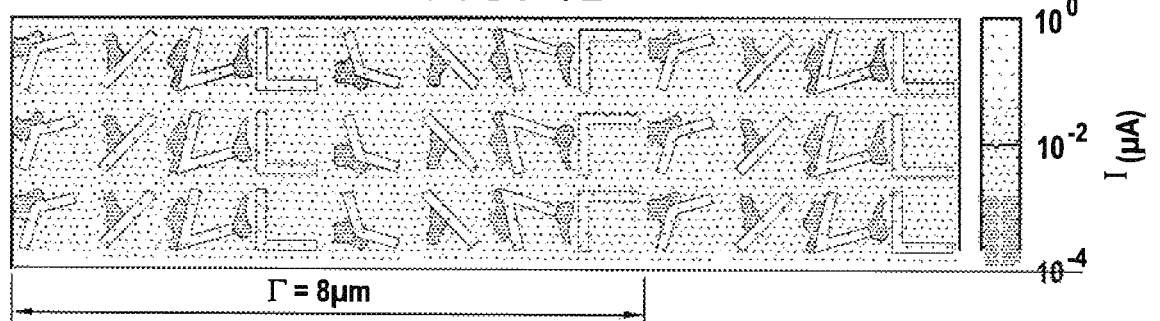

In the following, a series of gated VO$_2$ metasurface are studied with different $\Gamma$ of 40 μm and 8 μm. Firstly, the leakage current mappings of VO$_2$/Nb-doped TiO$_2$ clearly show that boomerang-shaped metallic VO$_2$ antenna arrays are successfully created in the insulating VO$_2$ matrix with $\Gamma$ of 40 μm and 8 μm (see FIGS. 4A and B), which are consistent with what is observed in the case of $\Gamma$=16 μm.

Far-Field Response of VO$_2$ Metasurface Grown on Pure TiO$_2$ Substrate

Figure 4C:
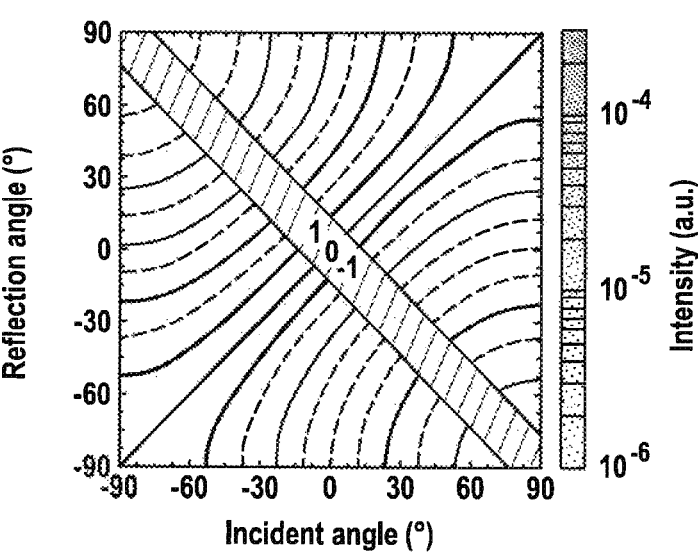
Figure 4D:
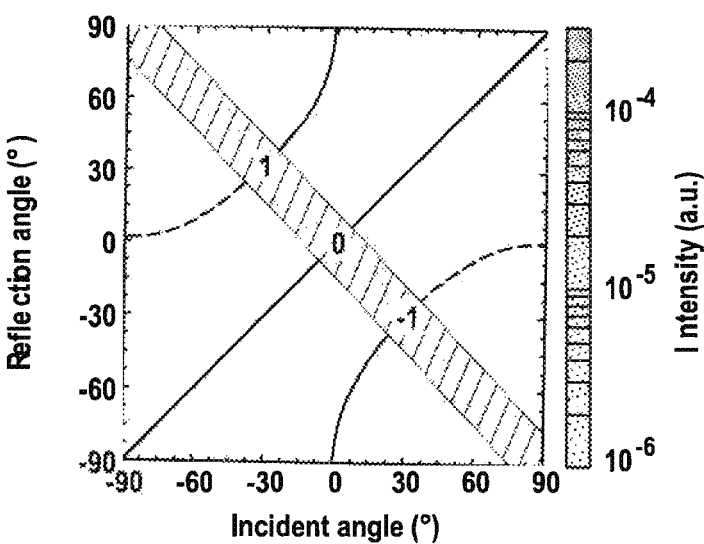
Figure 4E:
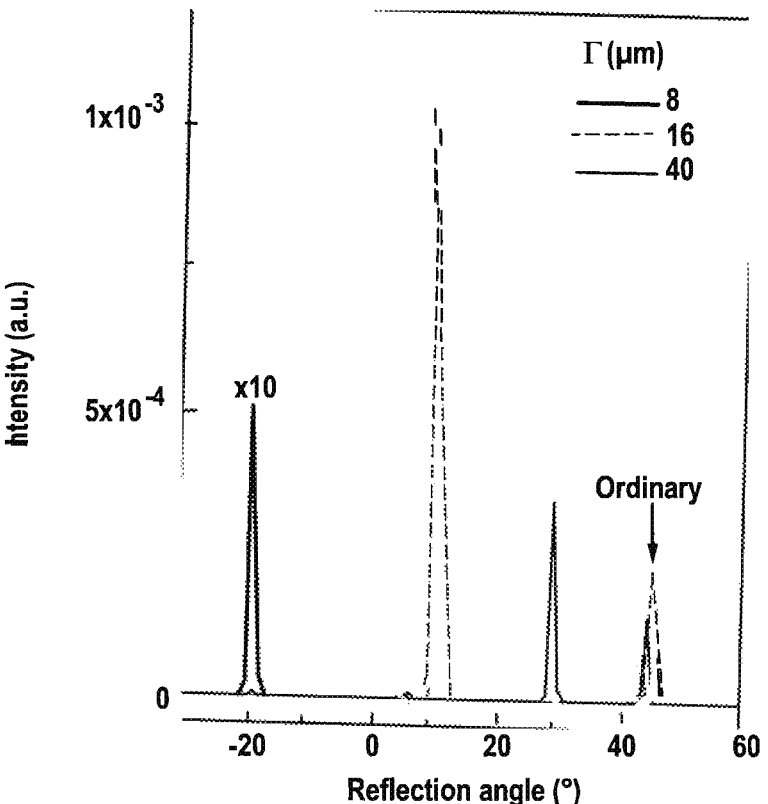

FIGS. 4C and D show the $\theta_r$ versus $\theta_i$ for the reflection of VO$_2$ metasurface with periodicity of $\Gamma$=40 μm and 8 μm, respectively. Remarkably, both samples show anomalous reflections, which agree well with theoretical prediction of Eq. 1. Compared with the complex reflection mapping for the case of $\Gamma$=40 μm with diffractions, only anomalous reflections with orders of −1 and 1 could be observed in the case of $\Gamma$=8 μm. FIG. 4E summarizes the results of the ordinary and the anomalous reflections for samples with different $\Gamma$ with a fixed incident angle of 45°. With the shrinkage of F from 40 μm to 8 μm, the anomalous reflections (N=−1) shift from 30.0° to −18.0° gradually. In theory, the sample with smaller F corresponds to the larger phase gradient and the resultant larger divergence between ordinary and anomalous reflections. The positions of anomalous reflections calculated by Eq. 1 are marked by black dotted lines in FIG. 4E, which agree with the experimental data.

It has thus been shown that ILG can induce an insulator-to-metal transition followed by dramatic changes in optical properties of VO$_2$ thin film. By introducing a resist mask, such a metallic phase can be locally created in the insulating parent phase by ILG. The metallic VO$_2$ antenna array with the insulating VO$_2$ host material realizes a full $2\pi$ phase manipulation of the optical phase in the near-field and leads to anomalous reflections at far-field consistent with the generalized Snell's law. Such a spatially selective gating engineering represents a new paradigm for active photonic structures and devices.

Methods

Sample Preparation

The $VO_2$ films of 20 nm thickness were deposited on (001) oriented pure or 0.5 wt % Nb-doped $TiO_2$ substrate by pulsed laser deposition (PLD) in an oxygen pressure of 1.9×10–2 mbar at 380° C.

Figure 5:
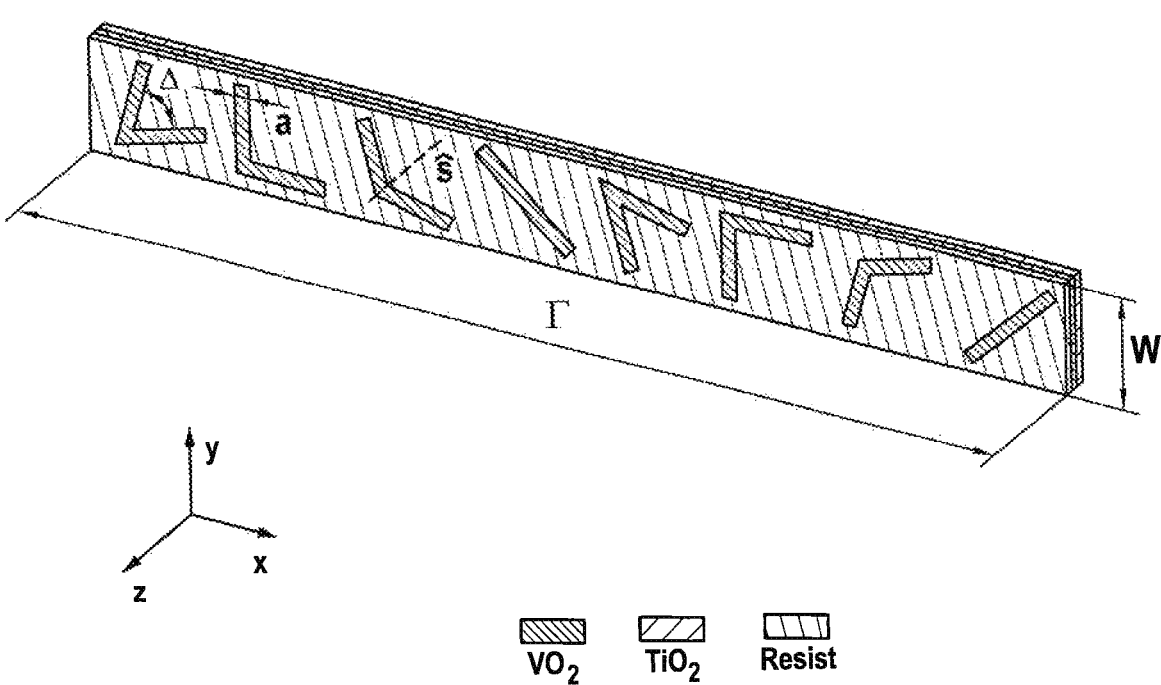

A boomerang-shaped antenna array was designed to excite both symmetric and the antisymmetric modes by y-polarized incident light for all the antennas. The boomerang-shaped antennas consist of two rectangular arms with width a, which are connected at the center of one end at an angle Δ. The symmetry axis ŝ of the first four antennas of the unit cell is oriented along the 45° diagonal between the x- and y-axes, and their opening angles are Δ=60°, 90°, 120°, and 180°, respectively. The second four antennas are copies of the first four with rotating clockwise by 90° (FIG. 5). Thus, the metasurface unit cell containing eight boomerang-shaped antennas will be able to introduce constant phase gradient $2\pi/\Gamma$ along the x-axis to the light scattered in cross-polarization, where $\Gamma$ is the length of the unit cell in x-axis direction (periodic length). W is the width of the unit cell in y-axis direction. The a of arms in boomerang-shaped antennas is changed from 50 to 500 nm, with corresponding $\Gamma$ and W change from 4 to 40 μm and 0.5 to 5 μm, respectively.

Such boomerang-shaped antennas hole arrays are made on the positive resist (ARP 6200.09, Allresist) using electron beam lithography (EBL) (Raith Nanofabrication system). After spin coating at 400 rpm, ~200 nm resist was achieved on the surface of sample and then baked at 150° C. for 1 minute. After exposure at a dose of 150 $\mu C/cm^2$, the sample was developed in AR 600-60 for 30 s. Before ionic liquid gating, the resin was etched using reactive ion etching (Plasmalab100, Oxford) to slightly remove ~20 nm residual resist after development. Such a pattern could be made in a larger area of 4.8×3.2 $mm^2$ for the far-field reflection measurements. One unit cell of boomerang-shaped antennas with resist pattern is schematically shown in FIG. 5.

The ionic liquid EMIM-TFSI [1-Ethyl-3-methylimidazolium bis(trifluoromethylsulfonyl)-imide], was used for all gating experiments. The IL gating was performed in a probe station (pressure<$10^{-6}$ mbar) and VG=+3 V was applied for 30 minutes. After gating the IL and resist were removed using acetone and isopropanol. Transistor devices for transport measurements were prepared by photo-lithography and wet etching in the form of Hall-bars with lateral gate electrodes located in the vicinity of the channel. The channel is 400 μm long and 100 μm wide. Electrical contacts to the edge of the channel were formed from Au (60 nm)/Cr (10 nm) that was deposited by thermal evaporation.

Sample Characterization

The transport properties were carried out in a Quantum Design DYNACOOL™. THE CAFM function in a Cypher-atomic force microscopy (Asylum Reserach) was used to measure the current flowing across the sample (perpendicular to the surface). A 1 MΩ resistor was connected in series with the $VO_2$/Nb-doped TiO2 at a constant voltage of 2 V. A silicon tip with a Ti/Ir coating (Asyelec-01) was used (tip radius ~28±10 nm). The optical constants before and after gating were measured by ellipsometry (M-2000® and IR-VASE® Ellipsometer from J. A. Wollam)

The Neaspec scattering-type scanning optical near field microscope (s-SNOM) utilizes a metal-coated AFM cantilever operated in tapping mode (f=250 kHz). During the measurement the sample surface is scanned underneath the cantilever. The area of the sample in the vicinity of the cantilever is illuminated with 6.20 μm mid-infrared light focused via a parabolic mirror from the backside in a transmission mode. The incident light excites plasmonic modes of the fabricated nanostructures, which in response generate local electrical fields. Due to the operation in tapping mode, the distance between cantilever and sample surface is modulated sinusoidally. Because of the strongly nonlinear interaction of the tip with the surrounding electrical field with respect to the tip-sample distance, a sinusoidal distance modulation results in the generation of high harmonic signal components in the scattered light intensity. The scattered light is collected and focused on an MCT-detector. A lock-in demodulation at higher harmonics of the tapping frequency ensures an almost background-free measurement. Amplitude and phase information in the detected signal are separated with the aid of an interferometric technique. This so called pseudoheterodyne detection involves a Michelson interferometer where the light from the s-SNOM tip interferes with a reference.

Figures 8A, 8B, 8C, 8D:
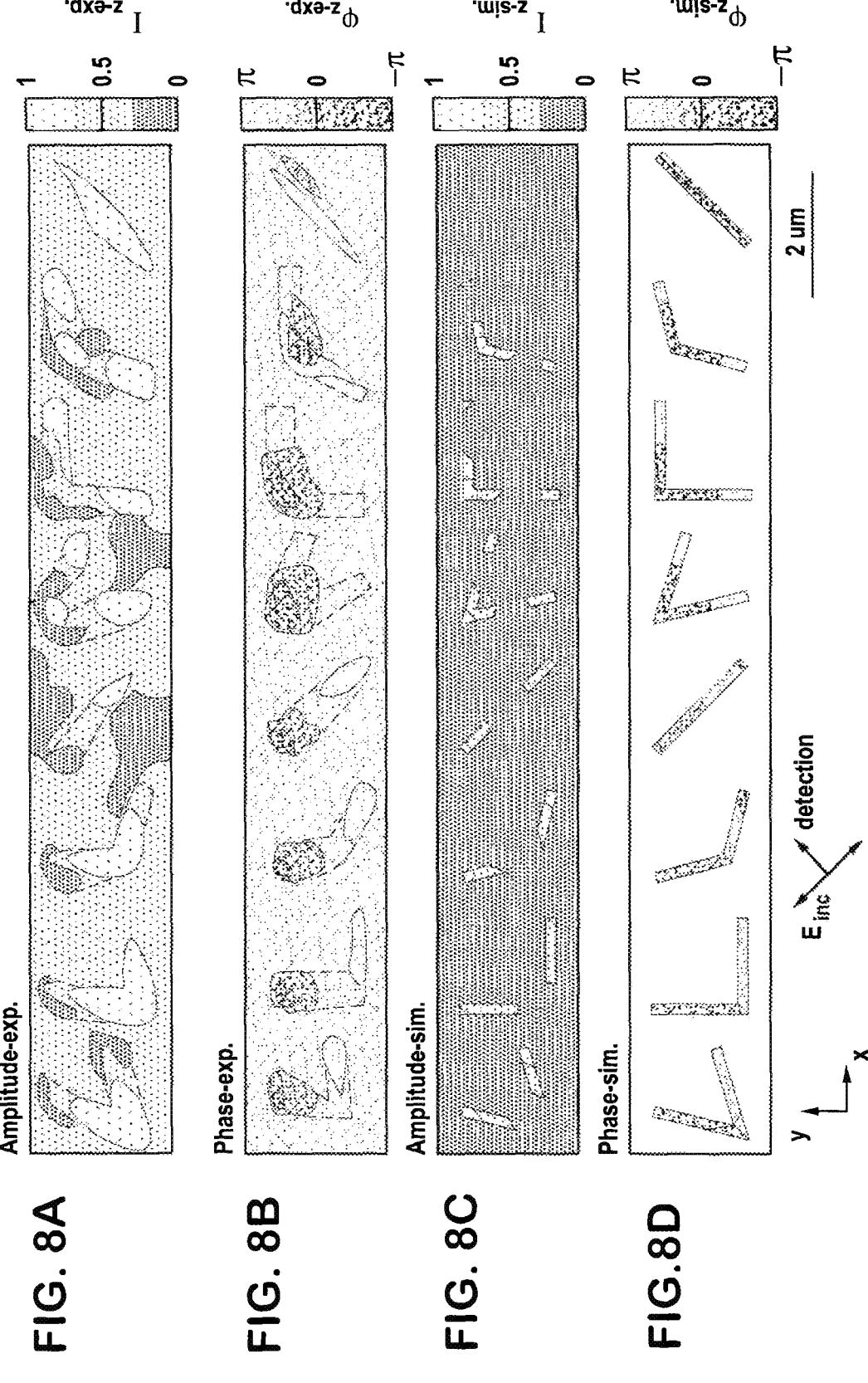
Figure 9H:
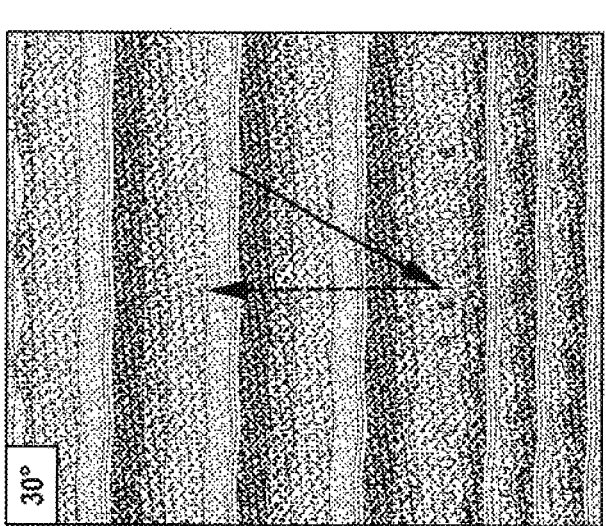
Figure 9G:
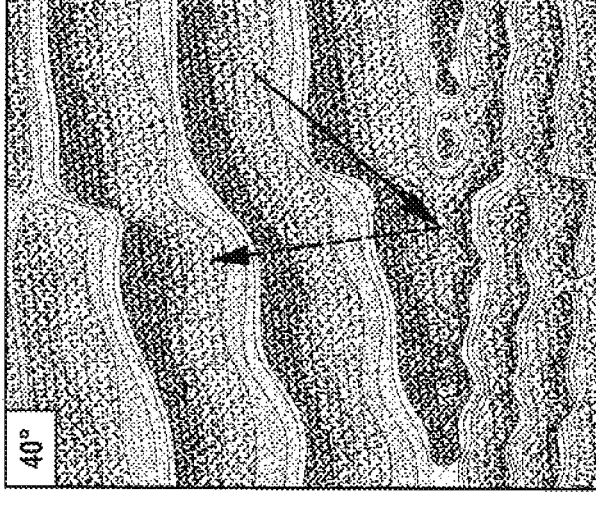
Figure 9F:
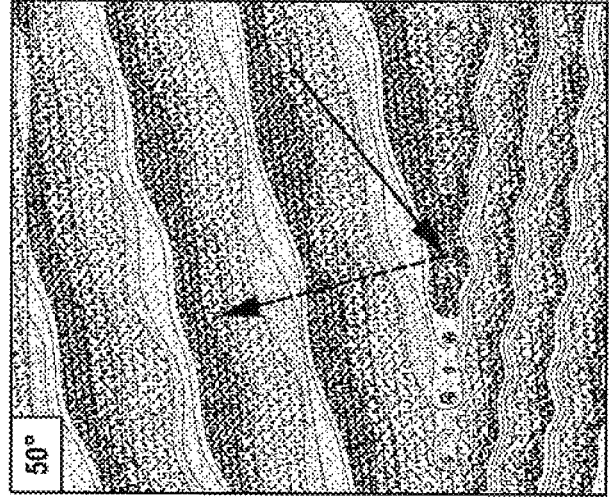

FIGS. 8A and B shows the intensity and phase maps of the electric-field component along z direction at near field for the $VO_2$ metasurface ($\Gamma$=16 μm) when the angle between the polarization of incident light and x (or y) axis is 45°. In this configuration, the left four metallic $VO_2$ antennas are excited in an antisymmetric mode while the right four ones are excited in a symmetric mode. In the amplitude map (FIG. 8A), both the tips and the vertex of each antenna are bright in symmetric mode, while in the antisymmetric mode the vertex stays dark indicating no field buildup at the center. On the other hand, the phases of the two arms of antenna look similar in symmetric mode (symmetric along the incident polarization direction), but those in antisymmetric mode show a difference of ~π. The simulated amplitude (FIG. 8C) and phase (FIG. 8D) are well in line with the experimental results. All of these observations are in line with previous work in Au/Si system.

In the far-field reflection measurement setup, a quantum cascade laser (QC) with a wavelength 8.05 μm is used. A polarizer allows to select the polarization. The incident light is slightly focused using a Kepler telescope (f=50 cm). The sample is mounted on a motorized 360° rotation stage and located at the focus of the telescope. This enables the setting of any incident angle of the laser with respect to the sample surface normal. The slight focusing of the incident beam ensures a small spot size on the sample surface. The reflected light intensity is measured using a detector mounted on a second 360° rotation stage. Thus, all possible incident and reflected angles can be addressed, except for those where the detector blocks the path of the incident light (reflected angle close to incident angle). An aperture in front of the detector is used to increase the angular resolution to the sub-degree range. Additionally, an analyzer (2nd polarizer) in front of the detector can be used to selectively only detect the parallel or the cross-polarized component of the scattered light. For the mid-infrared light a mercury cadmium telluride (MCT) detector is used. Lock-in amplification is used to increase the dynamic range of the detection. For this an optical chopper located at the inner focal point of the Kepler telescope is used. In this way a dynamic range of about six orders of magnitude is obtained.

Simulation

The near-field and far-field simulations for one unit cell of antenna array were performed using the RF module from COMSOL MULTIPHYSICS® on a server workstation.

The invention claimed is:

1. A method for chemically transforming a surface of a substrate into a metasurface which is a plasmonic array comprising the steps of:

I. providing a surface on a substrate which exhibits at least two distinct measurable states of an optical property and which can stably but reversibly be transitioned from
  i. a first state of the optical property into at least
  ii. one second state of the optical property which is measurably distinct from the first state,
  by a change in a chemical composition of the surface of the substrate II. creating on the surface of the substrate at least one area
  i. outside of which the substrate is in the first state of the optical property, and
  ii. inside of which the substrate is in one of the at least one second state of the optical property,
  or
  iii. wherein the states of the optical property of the inside area and the outside area are inverted, and III. wherein step II further comprises defining and delineating a desired-to-be inside area on the surface of the substrate which is in the first state of the optical property via a resist cover layer and
  subsequently contacting the surface in the defined and delineated inside area with a liquid which reacts with the surface of the substrate material to form a chemical product that yields or brings about the transition into the at least one second state of the optical property within the inside area only,
  or
  wherein in step III the states of the optical property of the surface and the inside area are inverted and the substrate is $VO_2$, and the metasurface comprises a metallic $VO_2$ antennae array within an insulating $VO_2$ matrix, and IV. removing the resist cover layer after completion of the transition.

2. The method of claim 1, wherein the optical property is selected from one or more of refraction, diffraction, extinction, scattering, absorption, reflection, polarization or transmittance.

3. The method of claim 1, wherein the substrate has a thickness in the range of 1-100 nm.

4. The method of claim 3, wherein the thickness is in the range of 5-50 nm.

5. The method of claim 3, wherein the thickness is in the range of 7-15 nm.

6. The method of claim 1, wherein the liquid brings about a change in the chemical composition of the substrate material.

7. The method of claim 1, wherein the transition is instigated by applying an electric potential to the liquid.

8. The method of claim 7, wherein the electric potential is 0.1-10 Volts.

9. The method of claim 8, wherein the electric potential is 1-5 Volts.

10. The method of claim 8, wherein the electric potential is 2-4 Volts.

11. The method of claim 1, wherein the liquid is selected from one or more of water, an alcohol, a hydrocarbon or a halogen containing hydrocarbon.

12. The method of claim 11, wherein the alcohol is ethanol or methanol; the hydrocarbon is pentane or hexane, and the halogen containing hydrocarbon is chloroform.

13. The method of claim 1, wherein the liquid is an ionic liquid.

14. The method of claim 13, wherein the ionic liquid is selected from one or more of 1-Ethyl-3-methylimidazolium bis(trifluoromethylsulfonyl)imide (EMIM-TFSI), 1-Propyl-3-methyl-imidazolium bis(trifluoromethylsulfonyl)imide, 1-Butyl-3-methylimidazolium bis(tri-fluoromethylsulfonyl) imide and 1-Hexyl-3-methylimidazolium bis(trifluoromethyl-sulfonyl)imide.

15. A substrate comprising a metasurface whose composition is contained entirely within a chemically transitioned surface layer of a substrate manufactured according to the method of claim 1, wherein said metasurface controls a wavefront of electromagnetic waves.

16. The substrate of claim 15, wherein the substrate has a thickness of up to about 1 μm and the change in optical property is present through the entire thickness of the substrate.

17. The substrate of claim 15, wherein the second state of the optical property remains unchanged at conditions ranging from between 1° and 30° C. and between 950 and 1100 hPa for at least 100 days.

18. A planar lens, vortex generator, beam deflector, axicon, electromagnetic absorber, polarization converter or spectrum filters, for wireless communications, energy harvesting, imaging, or cloaking comprising the substrate metasurface of claim 15.

19. The method of claim 1, wherein the step of defining and delineating a desired-to-be inside area on the surface of the substrate comprises applying a removeable lithographic resist as the cover layer on the surface of the substrate and cutting out the desired forms that define and delineate the desired-to-be inside area.

20. The method of claim 19, wherein the lithographic resist is removed after completing the transition into the at least one second state by washing with a solvent and the obtained metasurface dried.

21. The method of claim 1, wherein the liquid is ionic liquid and the reaction occurs via ionic liquid gating with an electric potential applied between the liquid on the substrate material and the liquid applied to an isolated electrode.

22. The method of claim 1, wherein said method further comprises facilitating growth of the substrate via epitaxy.

23. A substrate comprising a metasurface, said substrate having at least one area that has been chemically transitioned, wherein said metasurface controls a wavefront of electromagnetic waves and the metasurface is formed by a process comprising the steps of:

(I). providing a surface on a substrate which exhibits at least two distinct measurable states of an optical property and which can stably but reversibly be transitioned from
  (i) a first state of the optical property into
  (ii) an at least one second state of the optical property which is measurably distinct from the first state,
  by a change in the chemical composition of the surface of the substrate (II). creating on the surface of the substrate at least one area
  (i) outside of which the substrate is in the first state of the optical property, and
  (ii) inside of which the substrate is in one of the at least one second state of the optical property,
  or
  (iii) wherein the states of the optical property of the inside area and the outside area are inverted, and

(III). wherein step (II) further comprises defining and delineating a desired-to-be inside area on the surface of the substrate which is in the first state of the optical property and subsequently contacting the surface in the defined and delineated inside area with a liquid which reacts with the surface of the substrate material to form a chemical product that yields or brings about the transition into the at least one second state of the optical property within the inside area only, or wherein in step (III) the states of the optical property of the surface and the inside area are inverted and the substrate is $VO_2$, and the metasurface comprises a metallic $VO_2$ antennae array within an insulating $VO_2$ matrix.

24. The substrate of claim 23, wherein the metallic $VO_2$ antennae are boomerang-shaped and range in size from 100 to 500 nm.

* * * * *